(12) United States Patent
Seguchi

(10) Patent No.: US 6,969,938 B2
(45) Date of Patent: Nov. 29, 2005

(54) HIGH-VOLTAGE ELECTRIC ROTATING MACHINE

(75) Inventor: Masahiro Seguchi, Oobu (JP)

(73) Assignee: Denso Corporation, Kariya (JP)

( * ) Notice: Subject to any disclaimer, the term of this patent is extended or adjusted under 35 U.S.C. 154(b) by 113 days.

(21) Appl. No.: 10/663,815

(22) Filed: Sep. 17, 2003

(65) Prior Publication Data

US 2004/0164637 A1    Aug. 26, 2004

(30) Foreign Application Priority Data

Sep. 17, 2002  (JP)  ............................. 2002-270006
Jun. 27, 2003  (JP)  ............................. 2003-184746

(51) Int. Cl.⁷ ............................................... H02K 3/00
(52) U.S. Cl. ...................... 310/184; 310/180; 310/198
(58) Field of Search ............................... 310/180, 184, 310/179, 198, 208, 260, 201

(56) References Cited

U.S. PATENT DOCUMENTS

| | | | |
|---|---|---|---|
| 5,122,705 A * | 6/1992 | Kusase et al. | 310/68 D |
| 5,654,602 A | 8/1997 | Willyoung | 310/179 |
| 5,955,810 A * | 9/1999 | Umeda et al. | 310/208 |
| 6,043,584 A | 3/2000 | DeHart | 310/260 |
| 6,201,332 B1 | 3/2001 | Umeda et al. | |
| 6,326,715 B1 * | 12/2001 | Asao et al. | 310/180 |
| 6,515,392 B2 * | 2/2003 | Ooiwa | 310/179 |
| 6,522,043 B2 * | 2/2003 | Masegi | 310/180 |
| 6,784,583 B2 * | 8/2004 | Umeda | 310/179 |

FOREIGN PATENT DOCUMENTS

| | | |
|---|---|---|
| GB | 1 195 398 A | 6/1970 |
| JP | A 35-5156 | 5/1960 |
| JP | A 35-5157 | 5/1960 |
| JP | A 35-7309 | 6/1960 |
| JP | A 2000-92766 | 3/2000 |
| JP | A 2000-228852 | 8/2000 |
| JP | A 2001-95186 | 4/2001 |
| SU | 1377964 A1 | 2/1988 |

* cited by examiner

Primary Examiner—Darren Schuberg
Assistant Examiner—Leda T. Pham
(74) Attorney, Agent, or Firm—Oliff & Berridge, PLC

(57) ABSTRACT

The present invention relates an electric rotating machine comprising a plurality of phase coils each composed of a plurality of partial coils each made by connecting segments each composed of an inside-slot conductor portion to be accommodated in each of slots of each of phase slot groups made in a stator core and an outside-slot conductor portion protruding from the slot. Of the plurality of partial coils constituting each of the phase coils, in each of the partial coils to be connected to an input/output terminal, its inside-slot conductor portion is accommodated in the slot other than end portions of the phase slot group in a circumferential direction of the stator core. This reduces the electric potential difference between the outside-slot conductor portion continuing thereinto and the outside-slot conductor portion of an adjacent phase coil, thereby improving the insulating performance.

8 Claims, 20 Drawing Sheets

U3 PARTIAL COIL WINDING

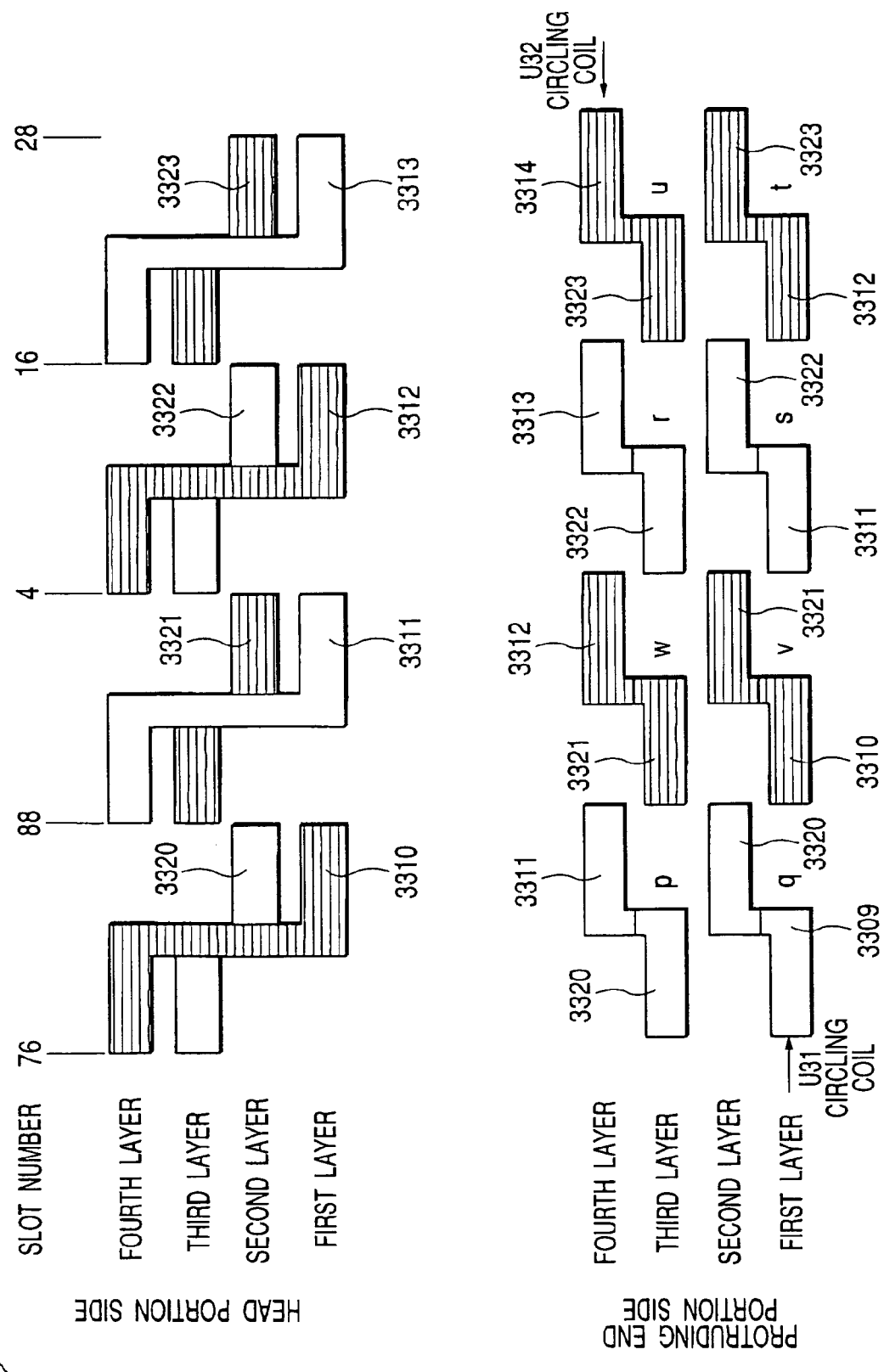

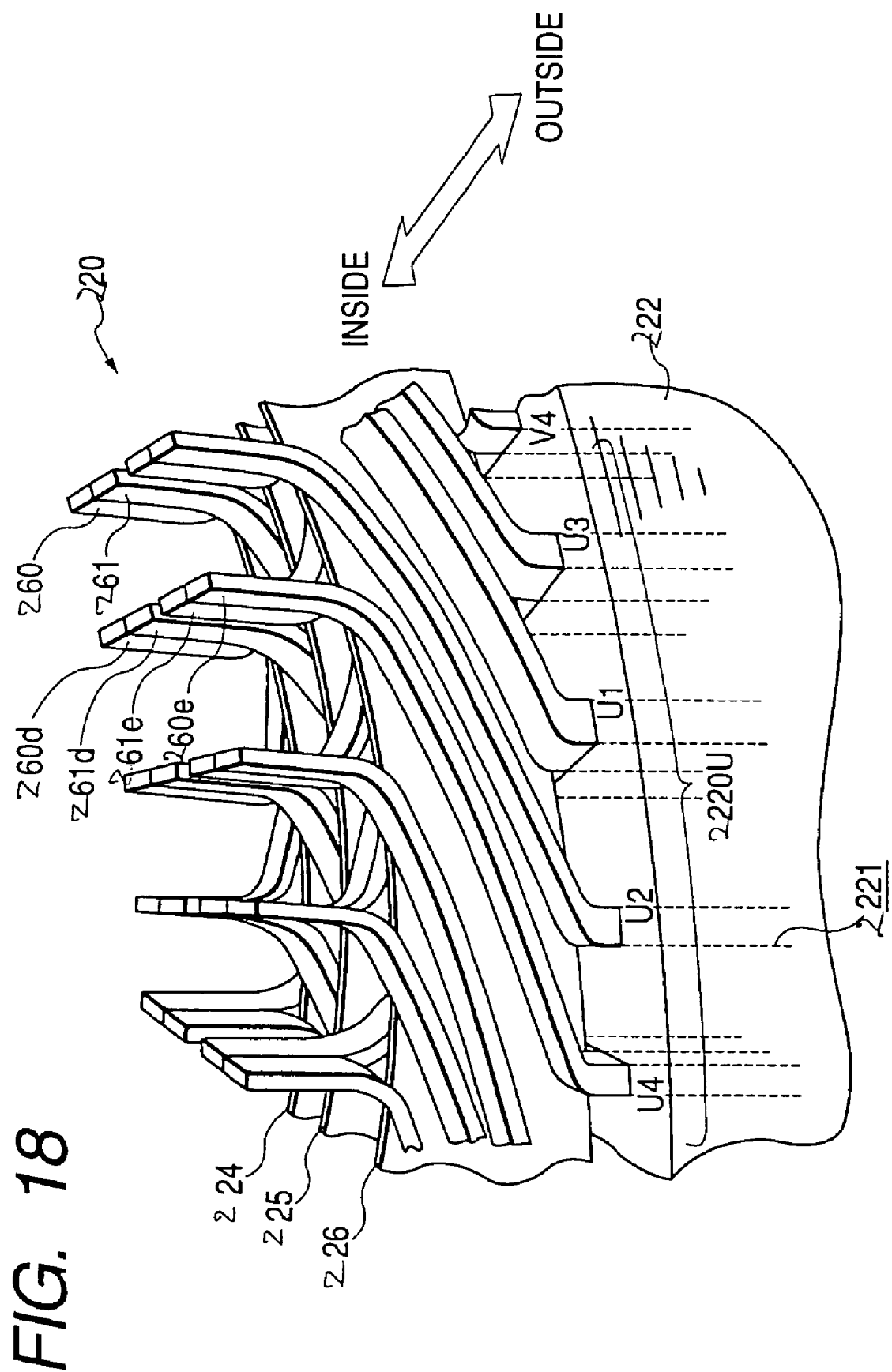

HIGH-VOLTAGE ELECTRIC ROTATING MACHINE

BACKGROUND OF THE INVENTION

1) Field of the Invention

The present invention relates to a high-voltage electric rotating machine.

2) Description of the Related Art

In an electric rotating machine for use in a vehicle, stator windings are accommodated in slots made in a ring-like stator core so that the stator windings partially protrude from the stator core toward the exterior thereof in axial directions, i.e., toward coil end.

In the recent years, to meet the requirements for mounting without changing the volume in an engine room, there is a need to achieve the size reduction and high output of an electric rotating machine including coil ends. For the requirement to reach satisfaction, it can be considered to shorten the distance between the adjacent conductors to the utmost. However, in this case, an extremely large voltage difference occurs between the conductors, which creates a problem in insulating performance.

Concretely, an effective means for this requirement to reach satisfaction is improving the space factor of the windings, and a conventional electric rotating machine employs a technique using conductors (straight-angle lines) each having a rectangular configuration in cross section for stator windings, such as is disclosed in Japanese Patent Laid-Open No. 2000-92766. However, this construction is such that the conductors in a slot are put in phase while the slots adjacent to each other in a circumferential direction take different phases. For higher voltage, in other words, for enhancing the output of the electric rotating machine, an increase in number of turns, i.e., number of conductors in one slot, causes the conductors to overlap more at the coil end section, and when the electric rotating machine is designed to handle a high voltage, this creates a problem in insulating performance between the conductors adjacent to each other. On the other hand, lengthening the distance between the conductors creates a problem of the axial size of the electric rotating machine being enlarged.

For solving the above-mentioned problems, in a conventional electric rotating machine, conductors constituting a specific phase are accommodated in a plurality of slots adjacent to each other in a circumferential direction to increase the number of turns, such as is closed in Japanese Patent Laid-Open No. 2002-228852. This enables increasing the number of turns without increasing the number of poles of the rotor while reducing the number of conductors in one slot to maintain a small outer diameter. Moreover, since there is no need to increase the number of poles of the stator, it is possible to lower the frequency of the stator coil voltage at the same speed of rotation, which enables the reduction of the wiring inductance loss and the inverter switching loss (switching transient loss), thus leading to the improvement of efficiency. Accordingly, this realizes the cost reduction of the inverter and wirings and the reduction of loss and heat generation.

However, in the case of handling a higher voltage, even the construction disclosed in Japanese Patent Laid-Open No. 2002-228852 requires an increase in number of conductors and a reduction of coil ends, which leads to the necessity to shorten the distance between the conductors to the utmost, thereby creating a problem in insulating performance, for that an extremely large voltage difference occurs between the conductors.

SUMMARY OF THE INVENTION

The present invention has been developed with a view to eliminating the above-mentioned problems, and it is therefore an object of the invention to provide a high-voltage electric rotating machine capable of increasing the number of turns for handling a high voltage without increasing the number of poles of a stator and further of maintaining the insulating performance even in the case of shortening the distance between adjacent conductors.

For this purpose, in accordance with an aspect of the present invention, U-phase, V-phase and W-phase slot groups are successively formed in circumferential directions, thus decreasing the number of conductors in one slot. This enables increasing the number of turns while reducing the size in radial directions, and operating the electric rotating machine in a high-voltage condition without increasing the number of poles of the rotor, which realizes the low-cost inverter and wirings, and the reduction of loss and heat generation.

In addition, a plurality of partial coils constituting each of the U-phase, V-phase and W-phase slot groups, that is, outside-slot conductor portions of Un, Vn and Wn partial coils are connected to inside-slot conductors in Un, Vn and Wn slots arranged with regularity in circumferential directions. This enables the outside-slot conductors to be disposed with regularity in axial directions of the stator core.

Still additionally, of a plurality of partial coils of each of phase coils, inside-slot conductors of U1, V1 and W1 partial coils forming input/output terminal connection partial coils are disposed in, of phase slot groups, slots other than end positions in circumferential directions. This can decrease the electric potential difference between an outside-slot conductor portion connected thereto and an outside-slot conductor portion of the adjacent phase coil, thereby improving the insulating performance.

In this specification, the "slot" signifies a conductor accommodation space having a size for accommodating one conductor of a stator winding, and it is possible to employ a hole having a size for accommodating one conductor in a circumferential direction and made in an axial direction of the stator core. The present invention is not limited to this, it is also acceptable to employ, of a hole with a width extending in a circumferential direction for accommodating a plurality of conductors in a state adjacent in a circumferential direction, a space having a size for accommodating one conductor in a circumferential direction. In this case, one hole made in the stator core forms a plurality of slots in a circumferential direction.

According to a further aspect of the invention, an inside-slot conductor portion of a partial coil to be connected to a neutral point is disposed in, of each of the phase slot groups, a slot positioned at an end portion in a circumferential direction. This can decrease the electric potential difference between the outside-slot conductor portions connected thereto and an outside-slot conductor portion of the adjacent phase coil, thereby improving the insulating performance.

According to a further aspect of the invention, a head portion, a pair of inside-slot conductor portions and a pair of protruding end portions extending in a generally circumferential direction constitute a U-shaped segment. With this construction, the U-shaped segment is easy to handle and to accommodate in a slot of the stator core. Moreover, the protruding portions can be joined to each other in a state where a plurality of U-shaped segments are inserted in a slot in an axial direction, which provides a high workability. Still moreover, even if a stator core is constructed using a large number of U-shaped segments, since the inside-slot conductor portions are accommodated in, of an in-phase slot group, a slot residing at the same position in a circumferential direction, the joint portions can be arranged with regularity in a circumferential direction and the space factor of the windings is easily improvable.

According to a further aspect of the invention, the electric potential difference between the outside-slot conductor portions in the in-phase slot group is reducible, thus enhancing the insulating performance.

According to a further aspect of the invention, the electric potential difference between outside-slot conductor portions of a partial coil residing at an end position of a slot group and a partial coil of a slot group adjacent thereto is reducible and the electric potential difference between outside-slot conductor portions adjacent to each other in an in-phase slot group is also reducible, thus enhancing the insulating performance.

According to a further aspect of the invention, it is possible to lengthen the distance between the adjacent outside-slot conductor portions of each of partial coil groups, which enhances the insulating performance.

According to a further aspect of the invention, a large number of segments can be inserted into slots and coil groups can be placed in radial directions to be disposed with regularity, which contributes to shortening the coil end length. Moreover, the parallel connections of the coils arranged in parallel can increase the cross-sectional area of a conductor while reducing the current density, which easily enables a large-current high-output specification. Still moreover, it is possible to employ segments having a dimension which provides a high productivity.

This construction is concerned with the relationship between two phases in an electric rotating machine having a plurality of phase coils equal to or more than two phases.

According to a further aspect of the invention, first and second phase stop groups comprise first n slots and second n slots successively formed in a circumferential direction, and by decreasing the number of conductors in one slot, it is possible to increase the number of turns while maintaining the size reduction thereof in a radial direction and further to drive the electric rotating machine in a high-voltage specification without increasing the number of poles of the rotor, which realizes the low-cost inverter and wirings, and the reduction of and loss and heat generation.

Moreover, since outside-slot conductor portions of a first ns circling coil and a second ns circling coil are connected to first n inside-slot conductor portions and second n inside-slot conductor portions placed in regular order in a circumferential direction, the outside-slot conductor portions can be disposed with regularity in axial directions of the stator core.

Still moreover, the inside-slot conductor portions of an eleventh partial coil and a twenty-first partial coil of a plurality of partial coils forming each phase coil, which serve as input/output terminal connection partial coils, are disposed in, of each phase slot group, slots other than end positions in a circumferential direction. Accordingly, the outside-slot conductor portions connected thereto can provide a reduced electric potential difference with respect to the outside-slot conductor portions of the adjacent phase coil, thus enhancing the insulating performance.

Furthermore, in accordance with a further aspect of the present invention, there is provided an electric rotating machine comprising a stator core including phase slot groups each composed of a plurality of slots and made along its inner circumferential surface in its circumferential directions, and a stator coil including a plurality of phase coils each made by connecting a plurality of U-shaped segments (conductor segments) each composed of inside-slot conductor portions to be accommodated in the slots and outside-slot conductor portions protruding from the slots, wherein each of the phase coils is formed by connecting a plurality of concentric circling coils, each generally circling the stator core along the inner circumferential surface, and the inside-slot conductor portions of the U-shaped segment for making the circling coil of the plurality of circling coils which has an external leader terminal (external outgoing terminal) are accommodated in, of the plurality of slots constituting each of the phase slot groups, the slot which does not adjoin the slot group different in phase, and an insulating member is interposed between the outside-slot portions adjacent to each other in a radial direction of the stator core.

A phase coil is formed in a manner such that a plurality of circling coils are connected to each other and, of the circling coils, there is a circling coil having an external leader terminal. This circling coil has a high electric potential.

Moreover, a plurality of phase slot groups are made in a stator core and each of the phase slot groups is composed of a plurality of slots. The phase slot groups are repeatedly disposed in circumferential directions so that the phase slot groups different in phase from each other are arranged to be adjacent to each other.

If the inside-slot conductor portions of a U-shaped segment which makes the high-potential circling coil having an external leader terminal are accommodated in a slot existing at an end portion of the phase slot group, a large electric potential difference occurs stemming from each phase voltage between the slots existing at the end portions of the adjacent phase slot groups, which can lead to a dielectric breakdown.

On the other hand, in the electric rotating machine according to the present invention, the inside-slot conductor portions of the U-shaped segment constituting a high-potential circling coil having an external leader terminal are not accommodated in the slots existing at end portions of each of the phase slot groups. That is, the inside-slot conductor portions having an external leader terminal are accommodated in slots which do not adjoin a phase slot group different in phase. This can reduce the possibility that a large electric potential difference occurs stemming from each phase voltage between the slots existing at the end portions of the adjacent phase slot groups, which suppresses the occurrence of a dielectric breakdown in the circumferential directions of the stator core.

In addition, an insulating member is interposed between the outside-slot conductor portions adjacent to each other in circumferential directions of the stator core. Therefore, it is possible to suppress the occurrence of dielectric breakdown not only in the circumferential directions of the stator core but also in the radial directions thereof. In this case, the "between the outside-slot conductor portions" signifies, for example, "between a protruding end portion 260d and a protruding end portion 261d" shown in FIG. 15. Moreover, it signifies an inner circumferential side of a curved portion of a head portion 261c.

Preferably, the plurality of outside-slot conductor portions are disposed into a lattice-like configuration to intersect each other in an axial exterior of an axial end portion of the stator core, and the intersections between the outside-slot conductor portions are arranged in n rows in an axial direction from the axial end portion, and the insulating member is placed at the intersection positions going beyond the first row of the n rows.

That is, in this construction, the insulating member is not placed at the intersection in the first row. Assuming that the electric potential difference between the outside-slot conductor portions constituting the intersection in the first row shows a large value, there is a need to place an insulating member therebetween. However, the spacing between the outside-slot conductor portions forming the intersection in the first row is extremely short and, hence, difficulty is encountered in interposing the insulating member therebetween.

On the other hand, in the case of the electric rotating machine with this construction, as mentioned above, the inside-slot conductor portions having an external leader terminal are accommodated in slots which do not adjoin a phase slot group different in phase. Therefore, the electric potential difference between the outside-slot conductor portions forming the intersection in the first row is relatively small. This means that there is no need to an insulating member between these protruding end portions. Thus, this construction does not always require the interposition of an insulating member between the outside-slot conductor portions making the first-row intersection having a small spacing.

Preferably, the plurality of outside-slot conductor portions are disposed into a lattice-like configuration to intersect each other in an axial exterior of an axial end portion of the stator core, and the intersections between the outside-slot conductor portions are arranged in n rows in an axial direction from the axial end portion, and the insulating member is interposed at the intersection positions short of the n-th row of the n rows.

That is, in this construction, the insulating member is not placed at the intersection position in the n-th row. For example, when the outside-slot conductor portions are joined axially and outwardly with respect to the n-th intersection, the interposition of the insulating member in the n-th row can cause damages to the insulating member.

On the other hand, in the case of the electric rotating machine with this construction, as mentioned above, the inside-slot conductor portions are accommodated in slots which do not adjoin a phase slot group different in phase. Therefore, the electric potential difference is relatively small between the outside-slot conductor portions constituting the n-th-row intersection and, hence, it is unnecessary that an insulating member be interposed between these protruding end portions. Thus, this construction does not always require the interposition of an insulating member between the outside-slot conductor portions making the n-th-row intersection easily damaged by the joining operations.

More preferably, the plurality of outside-slot conductor portions are disposed into a lattice-like configuration to intersect each other in an axial exterior of an axial end portion of the stator core, and the intersections between the outside-slot conductor portions are arranged in n rows in an axial direction from the axial end portion, and an insulating member is interposed at the intersection positions going beyond the first row but at the intersection positions short of the n-th row. This improves the insulating member interposition workability and reduces the possibility of the insulating member being damaged by the joining operation between the outside-slot conductor portions.

Furthermore, in accordance with a further aspect of the present invention, there is provided an electric rotating machine comprising a stator core including a plurality of slots disposed along its inner circumferential surface, and a stator coil including a plurality of concentric circling coils each made in a manner such that a plurality of U-shaped segments each composed of inside-slot conductor portions to be accommodated in the slots and outside-slot conductor portions protruding from the slots are connected to each other along the inner circumferential surface of the stator core to approximately circle the inner circumferential surface thereof, wherein an insulating member is previously interposed between, of the outside-slot conductor portions adjacent to each other in radial directions of the stator core, the outside-slot conductor portions having the relationship in which the outer circumferential side outside-slot conductor portion is disposed in a state inclined in a radial and outward direction and in a circumferential direction of the stator core with respect to an inner circumferential side protruding end portion to suppress sliding contact therebetween when the inner circumferential side outside-slot conductor portion is inclined in said radial and outward direction and in said circumferential direction.

That is, in the electric rotating machine according to the present invention, in the segment assembling operation, prior to inclining the outside-slot conductor portions in the outward, radial and circumferential directions, an insulating member is interposed in advance between the outside-slot conductor portions adjacent radially to each other. Accordingly, the sliding contact between the outside-slot conductor portions adjacent radially to each other is avoidable by the insulating member. This can considerably reduce the possibility of the insulating coat of the outside-slot conductor portions being damaged. That is, it is possible to decrease the possibility that the dielectric breakdown occurs in the radial directions of the stator core.

Moreover, since the insulating member is interposed between the outside-slot conductor portions, the slippage improves when the outside-slot conductor portions are inclined in the outward, radial and circumferential directions. This facilitates the segment assembling operations.

BRIEF DESCRIPTION OF THE DRAWINGS

Other objects and features of the present invention will become more readily apparent from the following detailed description of the preferred embodiments taken in conjunction with the accompanying drawings in which:

FIG. 6B is an illustration of wire connections of segments of U31 circling coils and U32 circling coils in the first embodiment;

FIG. 18 is a perspective view showing a protruding end portion side stator coil end portion of the electric rotating machine according to the fourth embodiment;

DESCRIPTION OF THE PREFERRED EMBODIMENTS

With reference to the drawings, a description will be given hereinbelow of embodiments of the present invention in the case of a sequential segment joining stator coil type high-voltage electric rotating machine for use in a vehicle.

First Embodiment (Description of the Entire Construction)

Figure 1:
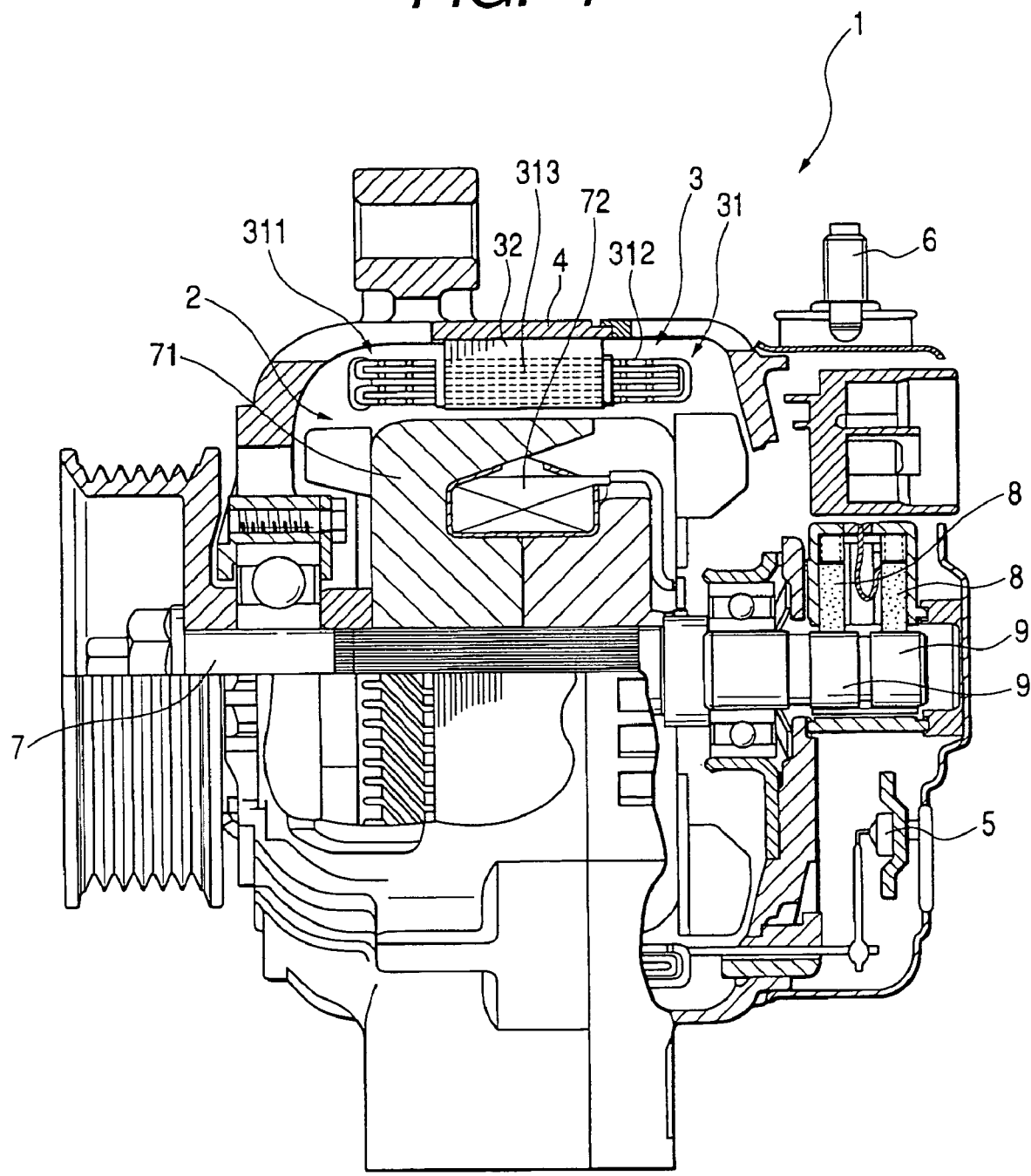
FIG. 1 is an axial cross-sectional view showing a construction of an electric rotating machine for use in a vehicle according to a first embodiment of the present invention.

In FIG. 1, a sequential segment joining stator coil type electric rotating machine, generally designated at reference numeral 1, is constructed as an AC (Alternating Current) generator comprising a rotor 2, a ring-like stator 3 forming a stator core, a housing 4, a rectifier 5 serving as a three-phase input/output terminal, an output deriving terminal 6, a rotary shaft 7, brushes 8 and slip rings 9. The stator 3 is composed of a stator coil 31 forming a stator winding and a stator core 32, with the stator core 32 being fixedly secured onto an inner circumferential surface of a circumferential wall of the housing 4 and the stator coil 31 being placed in slots of the stator core 32 in a wound condition. The rotor 2 is of a Lundell-pole type fixed to the rotary shaft 7 supported by the housing 4 to be rotatable, and is located on a radial inner side of the stator core 32, with an electromagnetic coil 72 and a pole core forming four pole pairs alternately in a rotating circumferential direction being fixedly secured to a rotor core 71.

The stator coil 31, forming a stator winding is a three-phase armature winding and is connected to the rectifier in unit of phase and is made to form three-phase star connections. In this embodiment, the rectifier 5 functions as an output terminal in the case of a generator.

Figure 2:
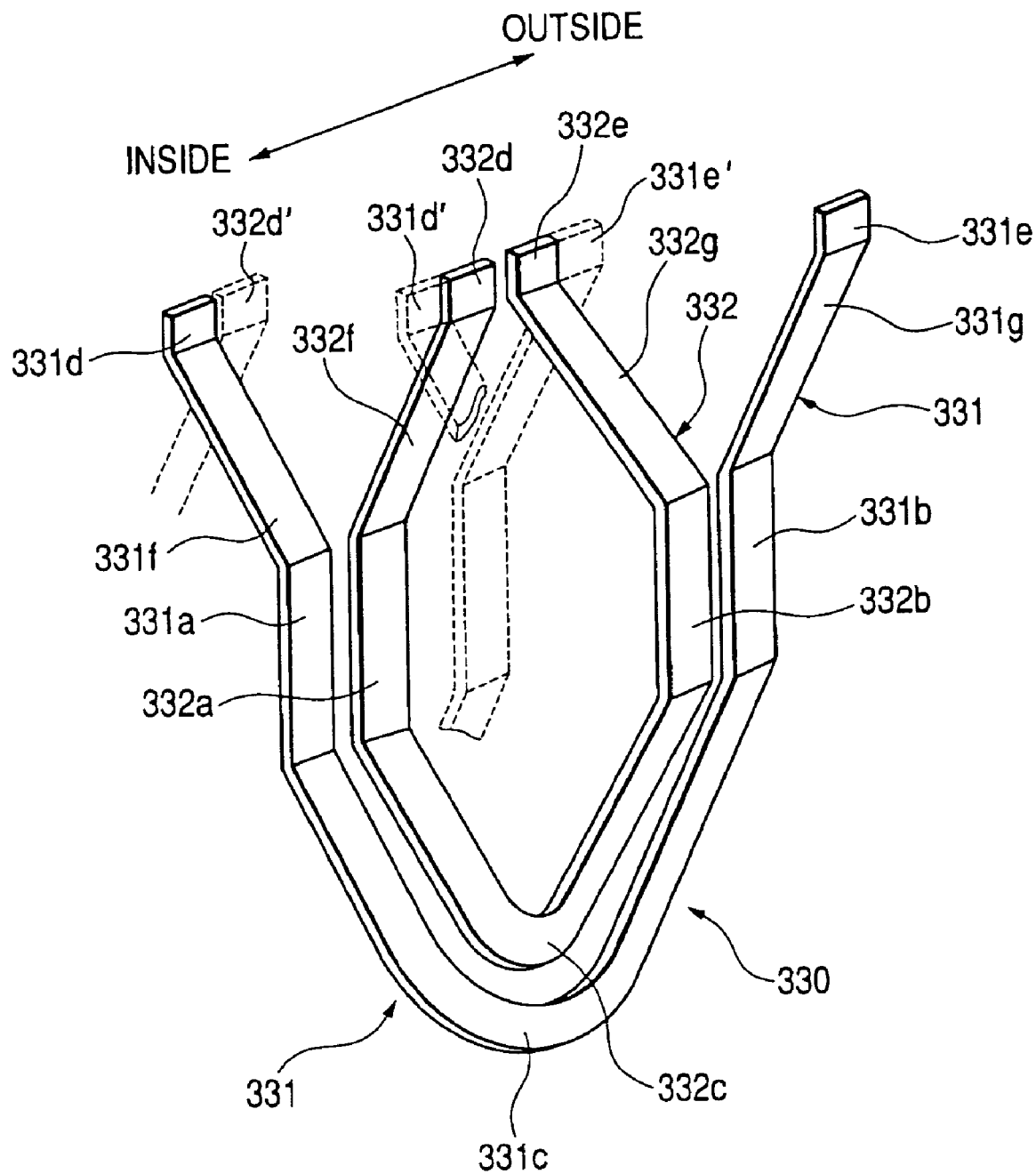
FIG. 2 is a perspective view showing a segment set to be used in the first embodiment.
Figure 3:
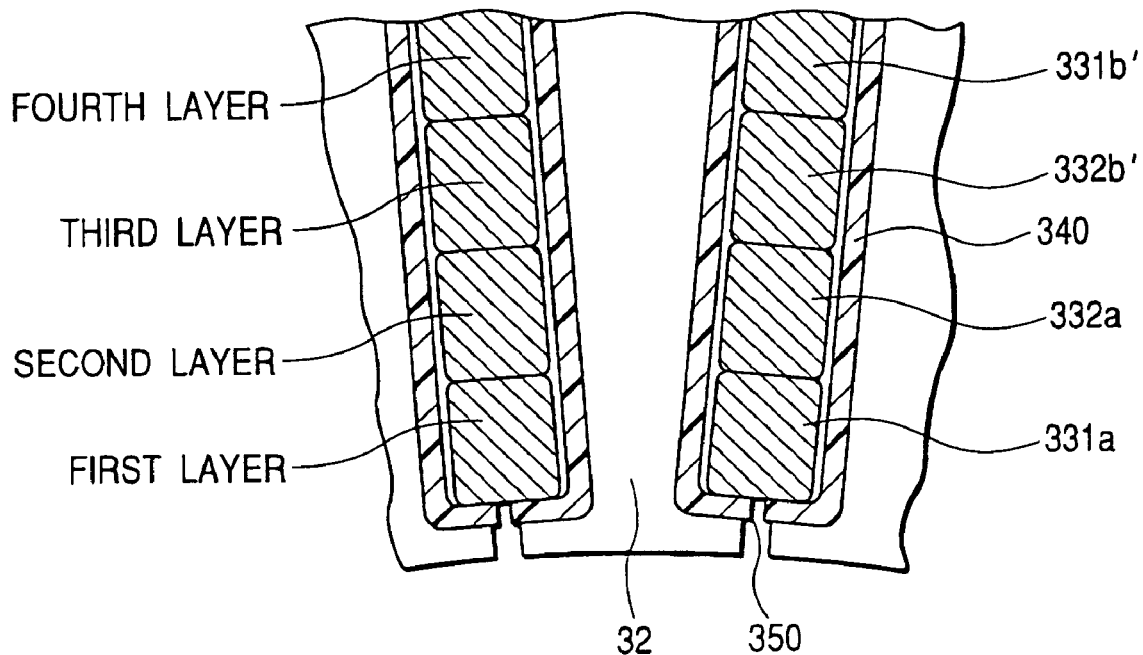
FIG. 3 is an illustration of locations of conductors in slots in the first embodiment.

Segment sets 330, shown in FIG. 2, are inserted through insulating paper 340 into a large number of slots 350, formed in the stator core 32 to penetrate in its axial directions and extend radially, from one side in the axial directions as shown in FIG. 3, and the radially adjoining tip portions thereof are sequentially connected to each other on the other side in the axial directions. The stator coil 31 has an end-side coil end 311 on the other side in the axial directions and a head-side coil end 312 on the one side in the axial directions. The sequential segment joining stator coil itself thus constructed is already well known. In this invention, the "input/output terminal" signifies an input terminal in a case in which the electric rotating machine is used as a motor and represents an output terminal if the electric rotating machine is used as a generator, but it does not always signify both the input and output functions.

(Description of Segment Set 330)

Referring to FIG. 2, a detailed description will be given hereinbelow of the segment set 330.

The segment set 330 is made up of one large segment 331 and one small segment 332 each composed of a generally U-shaped head portion, a pair of inside-slot conductor portions formed to extend linearly from both ends of the head portion and inserted into slots, and a pair of protruding end portions formed to extend from the tips of both the inside-slot conductor portions.

The head portions constitute the head-side coil end 312 (see FIG. 1) residing on one side of the stator core 32 in axial directions to have a U-like configuration as a whole while the protruding end portions constitute the end-side coil end 311 (see FIG. 1) existing on the other side of the stator core 32 in the axial directions to have a ring-like configuration as a whole.

The segment set 330 is composed of the large segment 331 and the small segment 332. The large segment 331 and the small segment 332 surrounded by the large segment 331 are referred to as a "segment set".

In the large segment 331, numerals 331$a$ and 331$b$ depict inside-slot conductor portions, numeral 331$c$ designates a head portion continuing into (connected to) the inside-slot conductor portions 331$a$ and 331$b$, and numerals 331$f$ and 331$g$ denote protruding end portions continuing into the inside-slot conductor portions 331$a$ and 331$b$. Each of the tip portions 331$d$ and 331$e$ of the protruding end portions 331$f$ and 331$g$ are joining portions to another segment and, hence, is equally referred to as a "joining portion". The inside-slot conductor portion 331$a$ is referred to as a "first-layer inside-slot conductor portion" while the inside-slot conductor portion 331$b$ is referred to as a "fourth-layer inside-slot conductor portion".

In the small segment 332, numerals 332$a$ and 332$b$ represent inside-slot conductor portions, numeral 332$c$ designates a head portion, and numeral 332$f$ and 332$g$ denote protruding end portions. Each of the tip portions 332$d$ and 332$e$ of the protruding end portions 332$f$ and 332G are joining portions and, hence, is equally referred to as a "joining portion". The inside-slot conductor portion 332$a$ is referred to as a "second-layer inside-slot conductor portion" while the inside-slot conductor portion 332$b$ is referred to as a "third-layer inside-slot conductor portion".

The sign ' signifies the same portion as the portions with no sign ' in a large segment or small segment which is not shown. Therefore, in FIG. 2, the joining portion 331d and the joining portion 332d' adjoining each other in a radial direction are welded to each other, and the joining portion 332d and the joining portion 331d' adjoining each other in a radial direction are welded to each other, and the joining portion 332e and the joining portion 331e' adjoining each other in a radial direction are welded to each other.

In FIG. 2, in a case in which the first-layer inside-slot conductor portion 331a and the second-layer inside-slot conductor portion 332a are accommodated in a predetermined slot of the stator core 32, in the same segments 331, 332, the fourth-layer inside-slot conductor portion 331b and the third-layer inside-slot conductor portion 332b are accommodated in a slot separated by a predetermined pitch from the predetermined slot. The head portion 332c of the small segment 332 is located to be surrounded by the head portion 331c of the large segment 331.

(Insertion of Segment Set into Slot 350)

The small segment 332 and the large segment 331 are inserted along an axial direction into a slot 350 which is made in an axial direction of the stator core 32 and which will be mentioned later and the protruding end portions 331f, 332f, 331g and 332g, which protrude from the slot 350 of the stator core 32 to the external, are joined to the other protruding end portions, respectively. This is repeatedly done in units of slots to form a circling coil which generally circles the stator core 32. In this embodiment, four circling coils are connected in series to each other to form one partial coil.

Figure 7:
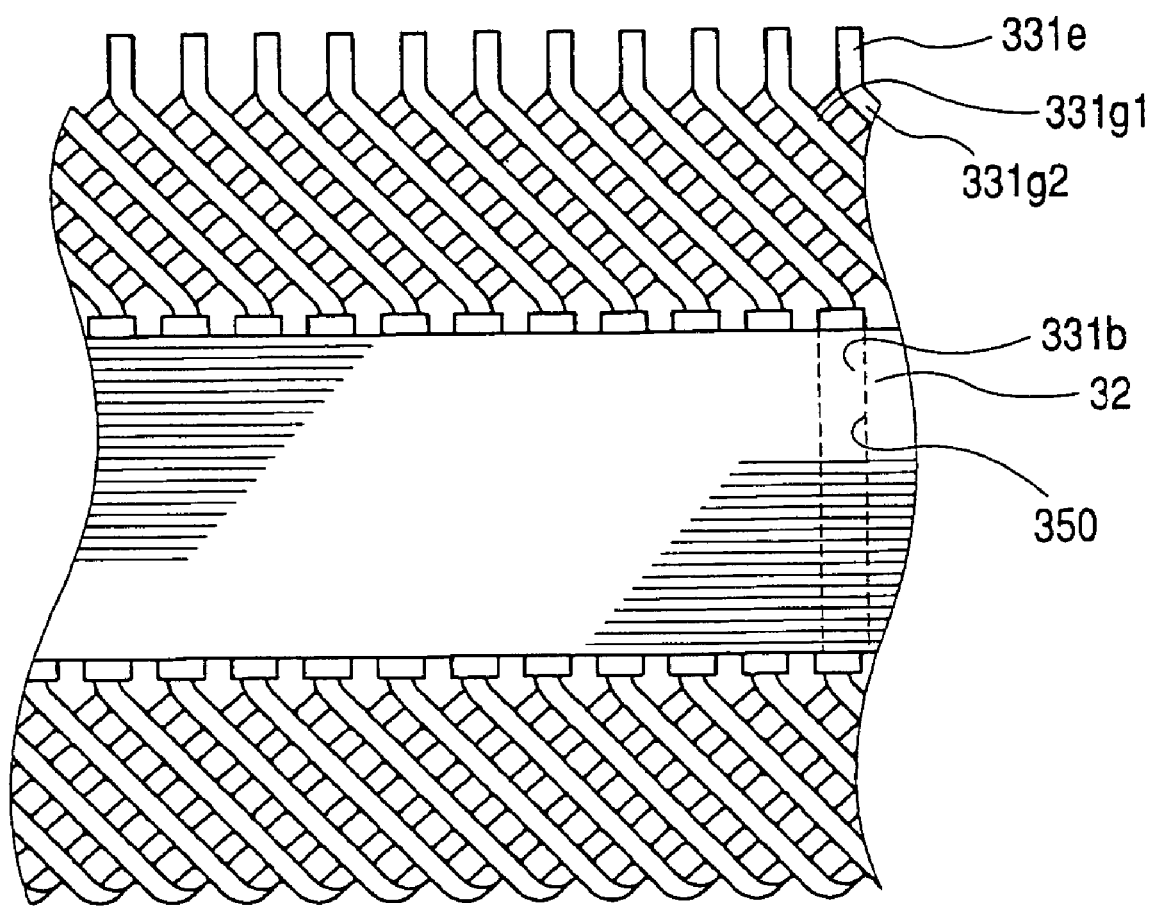
FIG. 7 is an illustration of a portion of a stator core in the first embodiment.

FIG. 7 is an illustration of a state in which the small segment 332 and the large segment 331 are inserted into the slot 350 of the stator core 32 in an axial direction, when viewed from the outside in a radial direction.

In the stator core 32, a protruding end portion 331g1 extending upwardly in the illustration is connected to another protruding end portion at a tip joining portion 331e. The protruding end portions continue into a large number of inside-slot conductor portions 331b, thus shortening the spacing between the protruding end portion 331g1 and the protruding end portion 331g2.

(Location of Segment Set in Slot)

FIG. 3 shows a location state of inside-slot conductor portions in the slot 350. FIG. 3 is an enlarged illustration of a portion of a construction shown in FIG. 6A In the slot 350, four conductor accommodation positions are set in a radial direction, and the four conductor accommodation positions adjacent in the radial direction are referred to as a conductor accommodation position set and are referred to as first layer, second layer, third layer and fourth layer in order from the inner side in the radial direction.

The four kinds of inside-slot conductor portions of the segment set described above with reference to FIG. 2 are inserted into the first-layer to fourth-layer conductor accommodation positions of these conductor accommodation position set.

Concretely, the inside-slot conductor portions 331a, 332a, 332b' and 331b' are accommodated in the first-layer to fourth-layer conductor accommodation positions of each of the conductor accommodation position sets in order in a radial direction. That is, when viewed from the inside in a radial direction, the first-layer inside-slot conductor portion 331a is accommodated in the first-layer conductor accommodation position, the second-layer inside-slot conductor portion 332a is accommodated in the second-layer conductor accommodation position, the third-layer inside-slot conductor portion 332b' is put in the third-layer conductor accommodation position, and the fourth-layer inside-slot conductor portion 331b' is put in the fourth-layer conductor accommodation position. In FIG. 3, the inside-slot conductor portions 332a and 332b' belong separately to two small segments 332, and the inside-slot conductor portions 331a and 331b also pertain separately to two large segments 331.

Figure 6A:
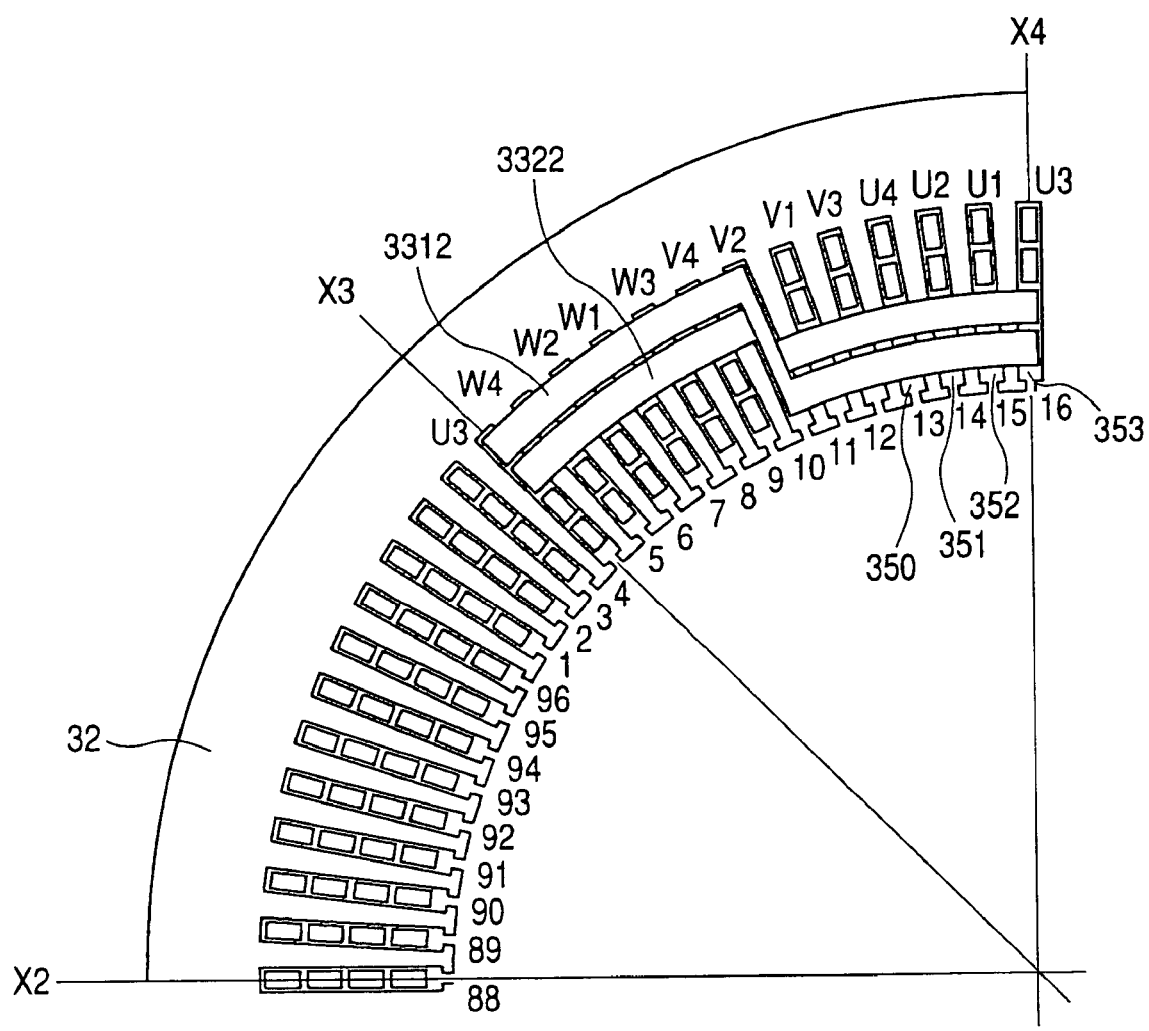
FIG. 6A is an illustration of locations of partial coils in slots in the first embodiment.

Although FIG. 3 shows a state in which the segment set 330 is accommodated in the slot 350, slots 351, 352, 353 . . . shown in FIG. 6A further exist at adjoining right positions in a circumferential direction in the illustration, and accommodate the inside-slot conductor portions of segment sets.

The four adjoining slots 350, 351, 352 and 353, including the slot 350, constitute a U-phase slot group, and a U-phase voltage in phase is applied to each of the segments accommodated in the U-phase slot group.

Each of the adjoining slots (in this case, 350 to 353) in a circumferential direction, which accommodate an in-phase phase winding, are referred to as an "in-phase slot", and these in-phase slots are refereed to as an "in-phase slot group" as a whole. Moreover, of the in-phase slot group, the in-phase slot 350 existing at the leftmost position is referred to as a "first in-phase slot, and in the rightward direction, the slots 351, 352 and 353 are referred to as "second in-phase slot, third in-phase slot and fourth in-phase slot", respectively. Each of the slots 350 to 353 has first-layer to fourth-layer conductor accommodation positions.

In this embodiment, each of the phase slot groups is made up of a plurality of adjoining slots, and the electric rotating machine can be driven as a high-voltage system without increasing the number of poles of the rotor, thereby realizing the low-cost inverter and wirings, and the reduction of loss and heat generation.

The phase slot groups are successively arranged in the order of W, V and U in a circumferential direction.

Moreover, since the number of phases is 3, the number of pole pairs is 4 and each of the phase slot groups is composed of 4 slots, the number of slots becomes 96. In general, when the number of pole pairs is taken as p, in a case in which the number of phases is 3 and an in-phase slot group is composed of n slots, the number of slots to be formed becomes 6 np.

(Description of Structure of Phase Coil)

Figure 4:
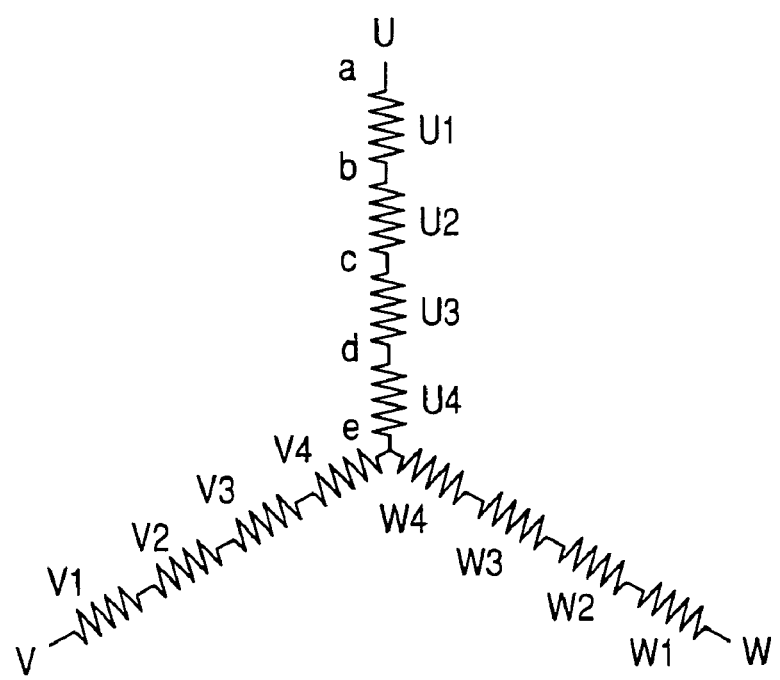
FIG. 4 is an illustration of connections of phase windings in the first embodiment.

In this embodiment, three phase windings of U, V and W are star-connected as shown in FIG. 4.

For the U phase, partial coils U1, U2, U3 and U4 are connected in series to each other.

The partial coil U1 is connected to an input/output terminal a, and the partial coil U4 is connected to a neutral point e.

Moreover, a connection point b exists between the partial coils U1 and U2, a connection point c between the partial coils U2 and U3, and a connection point d between the partial coils U3 and U4.

Likewise, for the V phase and W phase, the partial coils V1, V2, V3 and V4 are connected in series to each other and the partial coils W1, W2, W3 and W4 are connected in series to each other. Each of the partial coils V1 and W1 are connected to an input/output terminal, and the partial coils V4 and W4 are connected to the neutral point e.

Each of the partial coils is made such that four circling coils, i.e., first to fourth circling coils, are connected in series through the use of shape-different wave winding segments (not shown).

Each of the circling coils is made such that U-shaped segments are alternately connected. In more detail, lap winding segments each forming a small segment and wave winding segments each forming a large segment are alternately connected to generally circle the stator core 32.

In this case, the wave winding segment is a large segment (331) in which a pair of protruding end portions are bent in directions of separating from each other and inside-slot conductor portions are accommodated in the first-layer and fourth-layer conductor accommodation positions.

Moreover, in this case, the lap winding segment is a small segment (332) in which a pair of protruding end portions are bent in directions of approaching each other and inside-slot conductor portions are accommodated in the second-layer and third layer conductor accommodation positions.

(Description of Location of Each Phase Slot Group for Circling Coil)

Figure 5A:
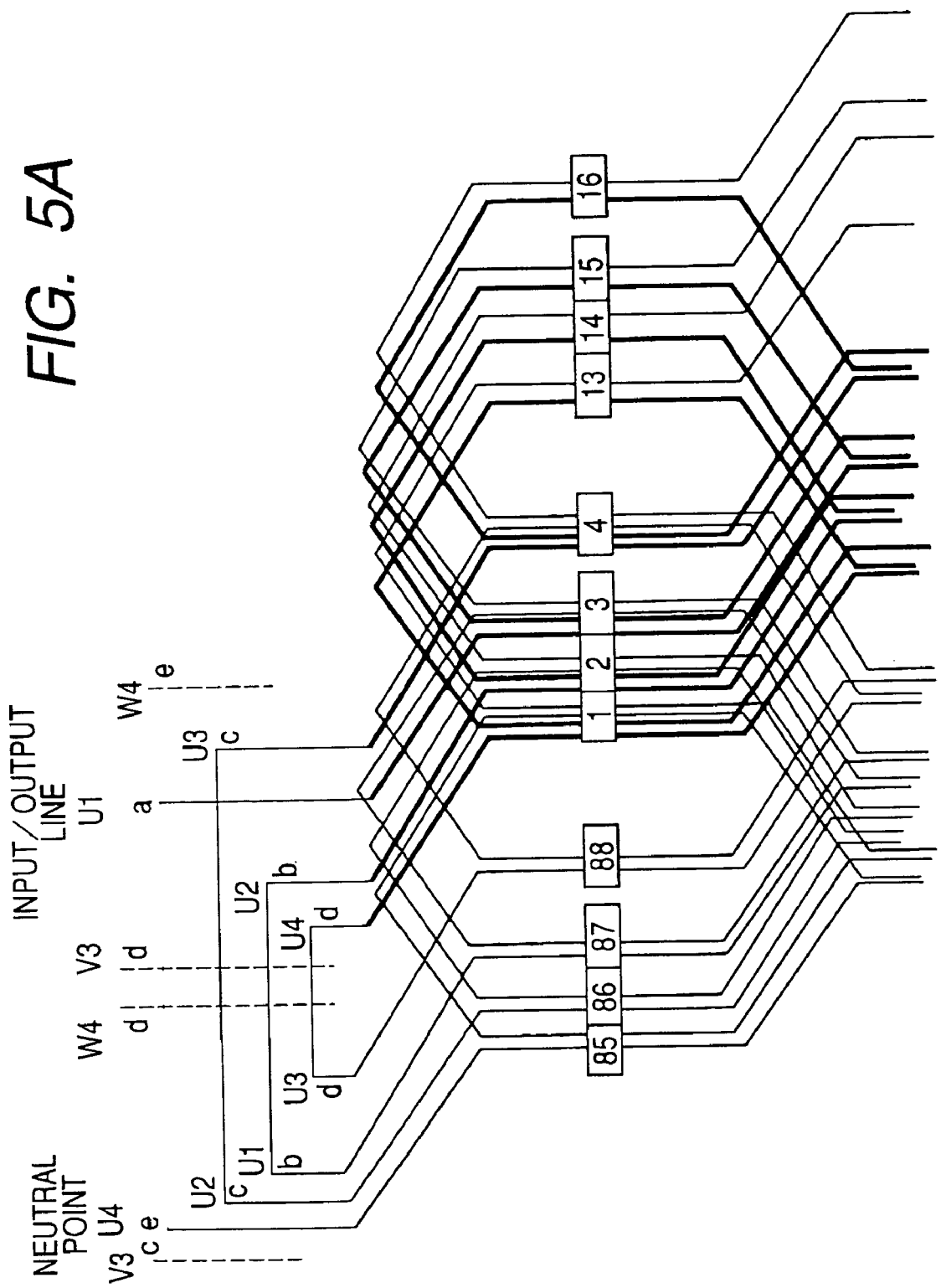
FIG. 5A is a development elevation of a U-phase winding in the first embodiment.
Figure 5B:
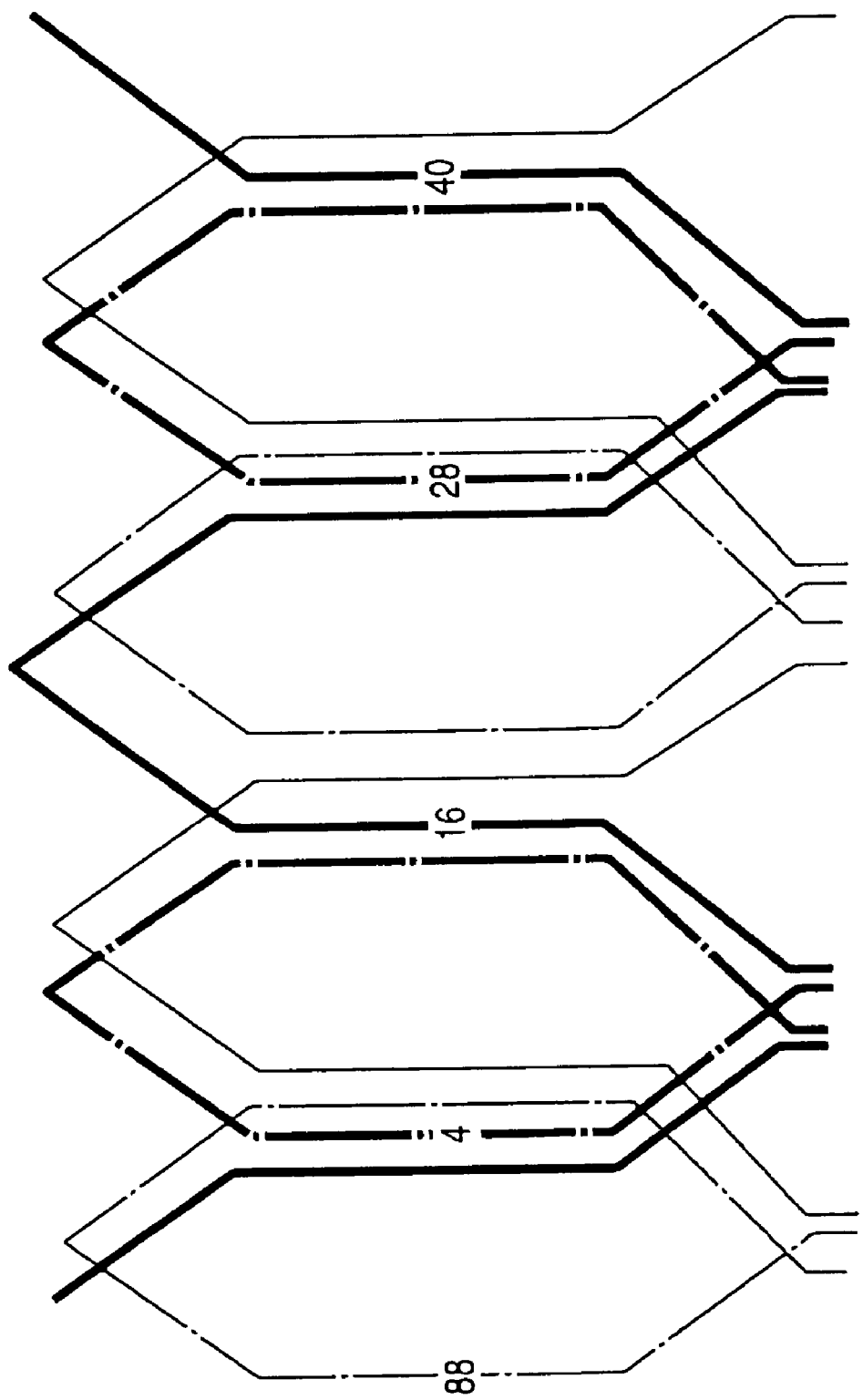
FIG. 5B is a development elevation of a U3-phase winding in the first embodiment.

FIGS. 5A and 5B are development elevations of a U-phase winding of a star-connected sequential segment joining stator coil 31. Naturally, the other phase windings have the same structure except being shifted in a circumferential direction.

In FIGS. 5A and 5B, inside-slot conductor portions are inserted in slots numbered 1, 2, 3, 4, 13, 14, 15, 16, 25, 26, 27, 28, 37, 38, 39, 40 . . . (12n+1, 12n+2, 12n+3, 12n+4).

The slot numbers 1, 13, 25, 37 (12n+1) signify the first in-phase slot 350. The slot numbers 2, 14, 26, 38 (12n+2) represent the second in-phase slot 351. The slot numbers 3, 15, 27, 39 (12n+3) depict the third in-phase slot 352. The slot numbers 4, 16, 28, 40 (12n+4) denote the fourth in-phase slot 353.

In FIGS. 5A and 5B, the four inside-slot conductor portions accommodated in one slot in a state adjacent to each other in a radial direction are shown in a state arranged at slot number positions in right- and left-hand directions (lateral directions) of the paper. In the case of the slot numbers 1 to 4, four inside-slot conductor portions are shown with respect to one slot number. On the other hand, in the case of the slot numbers 13 to 16 and 85 to 88, only two inside-slot conductor portions are shown for simplicity only.

In these illustrations, the positions of the four inside-slot conductor portions in lateral directions in the slot corresponding to each of the slot numbers do no correspond to the positions thereof in radial directions, and the locations of the inside-slot conductor portions in the radial directions are not shown in these illustrations.

Referring to FIGS. 4, 5A and 5B, a decision will be given hereinbelow of the positions of the partial coil connection points a to e. A shape-different segment different in shape from the U-shaped segment extending from the slot having the slot number 3 signifies the connection point a between the partial coil U1 and the input/output terminal, and the shape-different segment different in shape from the U-shaped segment extending from the slot having the slot number 85 signifies the connection point e between the partial coil U4 and the neutral point. The connection point b between the partial coils U1 and U2, the connection point c between the partial coils U2 and U3 and the connection point d between the partial coils U3 and U4 correspond to the shape-different segment different in shape from the U-shaped segments extending from the slots with the slot numbers 87 and 2, the shape-different segment different in shape from the U-shaped segments extending from the slots with the slot numbers 86 and 4, and the shape-different segment different in shape from the U-shaped segments extending from the slots with the slot numbers 88 and 1.

With reference to FIGS. 5A to 6B, a detailed description will be given hereinbelow of a circling coil of the U3 partial coil forming one of the partial coils and the locations thereof in the slots. The other partial coils have the same structure, and the description thereof will be omitted for brevity.

FIG. 6A shows, of 96 slots located in circumferential directions at outer circumferential positions of the ring-like stator core 32, 25 slots (slot numbers 88–96 and 1–16) positioned in a 90-degree angular range (including the positions on the 90-degree lines) and only head portions of a large segment 3312 and a small segment 3322. In this embodiment, the U-phase slot group, the V-phase slot group and the W-phase slot group, each of which is composed of four slots (n=4), are formed in the order of the W phase, V phase and U phase from the left side. The U-phase slot group, the V-phase slot group and the W-phase slot group constitute a set of slot groups, and four slot group sets are disposed over the entire circumference.

As each U-phase slot group, there are formed a U1 slot, a U2 slot, a U3 slot and U4 slot respectively corresponding to the partial coils U1, U2, U3 and U4. For the reason which will be mentioned later, the slot location is made in the order of the U4 slot, the U2 slot, the U1 slot and the U3 slot from the left side. For the V phase and the W phase, the slot locations are made in like manner.

Although the slots and slot groups are named as, for example, the U1 slot and the U-phase slot group in this specification, this is for convenience of the description on the relation between the phase coils only. Therefore, it is not required that such signs or identification marks actually appear on the stator core. Naturally, the signs or identification marks are also acceptable.

The partial coil U3 is accommodated in the slots having the slot numbers 4, 16, . . . 12n+4 shown in FIG. 6A. For an easy understanding, only the head portions of the large segment 3312 and the small segment 3322 accommodated in the slots with the slot numbers 4 and 16 are shown in FIG. 6A. Moreover, FIG. 6B shows a portion of the circling coils constituting the partial coil U3.

The circling coil U31 is composed of a large number of large segments 3311, 3313, . . . and a large number of small segments 3310, 3322 . . . .

The inside-slot conductor portions of the large segment 3310 are accommodated in the fourth layer of the slot with number 76 and the first layer of the slot with number 88. Moreover, the inside-slot conductor portions of the large segment 3311 are accommodated in the fourth layer of the slot with number 88 and the first layer of the slot with number 4, the inside-slot conductor portions of the large segment 3312 are accommodated in the fourth layer of the slot with number 4 and the first layer of the slot with number 16, and the inside-slot conductor portions of the large segment 3313 are accommodated in the fourth layer of the slot with number 16 and the first layer of the slot with number 28.

On the other hand, the inside-slot conductor portions of the small segment 3320 are accommodated in the third layer of the slot of number 76 and the second layer of the slot of number 88. Moreover, the inside-slot conductor portions of the small segment 3321 are accommodated in the third layer of the slot of number 88 and the second layer of the slot of number 4, the inside-slot conductor portions of the small segment 3322 are accommodated in the third layer of the slot of number 4 and the second layer of the slot of number 16, and the inside-slot conductor portions of the small segment 3323 are accommodated in the third layer of the slot of number 16 and the second layer of the slot of number 28.

In each of the large segment and the small segment, the head portion having a U-like line configuration and protruding toward one end side of the stator core makes a connection between the one end sides of its pair of inside-slot conductor portions. Moreover, its pair of protruding end portions continuing into the other end sides of the pair of inside-slot conductor portions protrude toward the other end side of the stator core to extend in generally circumferential directions. The head portion and the protruding end portions constitute an outside-slot conductor portion.

The large segment is a wave winding segment in which the pair of protruding end portions are bent in circumferential directions to separate from each other, with the protruding end portions being connected to the protruding end portions of the other small segments by means of, for example, welding.

The small segment is a lap winding segment in which the pair of protruding end portions are bent in circumferential directions to approach each other, with the protruding end portions being connected to the protruding end portions of the other large segments by means of, for example, welding.

A more detailed description will be given hereinbelow with reference to FIG. 6B. In the illustration, the circling coil U31 is indicated by white patterns, and in the large segment 3311 constituting the circling coil U31, one (left side) of its inside-slot conductor portions is accommodated in the slot 88 and the protruding end portion continuing thereinto is bent toward the slot 76 and is connected to the protruding end portion of the small segment 3320 at the point P. Moreover, the other inside-slot conductor portion (right side) thereof is accommodated in the slot 4 and the protruding end portion continuing thereinto is bent toward the slot 16 and is connected to the protruding end portion of the small segment 3322 at the point s.

One (left side) of the inside-slot conductor portions of the small segment 3322 is accommodated in the slot 16, and the other inside-slot conductor portion (right side) is accommodated in the slot 4, with they being connected through the head portion. The protruding end portion continuing into the one inside-slot conductor portion (left side) is bent toward the slot 16 to be connected to the protruding end portion of the large segment 3313 at the point r.

That is, in a range from the connection point p to the connection point r, one large segment 3311 and one small segment 3322 are connected to each other at the connection point s. The small segment 3322 is a lap winding segment shaped into a generally ring-like configuration around the slot 4 and the slot 16, while the large segment 3311 is a wave winding segment from the middle point between the slot 76 and the slot 88 to the middle point between slot 4 and the slot 16. A plurality of segment sets each thus constructed are placed successively in a circumferential direction to make a generally one circle in the circumferential direction, thereby forming the circling coil U31. That is, in FIG. 6B, the circling coil U31 is formed by connecting the large segment 3309, the small segment 3320, the large segment 3311, the small segment 3323 and the large segment 3313 in this order.

On the other hand, in FIG. 6B, the circling coil U32 is indicated by horizontal line patterns and is connected in a state where the rotating direction is reversed at the end of the circling coil U31. That is, the circling coil U32 extends in a direction indicated by an arrow at a lower and right side in the illustration, and the protruding end portions of a large segment 3314, a small segment 3323, a large segment 3312, a small segment 3321 and a large segment 3310 are successively connected at connection points u, t, w and v.

The small segment 3321 is a lap winding segment shaped into a generally ring-like configuration around the slot 88 and the slot 4, and the large segment 3312 is a wave winding segment from the middle point between the slot 88 and the slot 4 to the middle point between the slot 16 and the slot 28. A plurality of segment sets each thus constructed are placed successively in a circumferential direction to make a generally one circle in the circumferential direction, thereby forming the circling coil U32.

An end portion of the circling coil U31, which substantially circles the stator core clockwise as mentioned above, is connected through a shape-different segment (not shown) to an end portion of the circling coil U32 which substantially circles the stator core counterclockwise.

FIG. 5A shows the relationship between the partial coils U1, U2, U3 and U4 constituting the U-phase coil and the accommodation slot positions. That is, the inside-slot conductor portions of the partial coil U1 to be connected to the input/output line are accommodated in the slot with number 3 which is the U1 slot, and the inside-slot conductor portions of the partial coil U2 to be connected to the partial coil U1 are accommodated in the slot with number 2 which is the U2 slot. Moreover, the inside-slot conductor portions of the partial coil U3 to be connected to the partial coil U2 are accommodated in the slot of number 4 which is the U4 slot, and the inside-slot conductor portions of the partial coil U4 to be connected to the neutral point are accommodated in the slot of number 1 which is the U4 slot.

In addition, FIG. 5A simultaneously shows that the partial coil V3 of the V-phase coil is adjacent to the left side of the U-phase coil and the partial coil W4 of the W-phase coil is adjacent to the right side of the U-phase coil.

In the illustration, only portions of the partial coils V3 and W4 are shown for simplicity only, and as the positional relationship, the partial coil V3 adjoins the partial coil U4 and the partial coil W4 adjoins the partial coil U3.

In FIG. 5A, four partial coils are shown in an overlapping condition. For an easy understanding, the winding development of only the partial coil U3 is shown in FIG. 5B.

In FIG. 5B, thick solid lines represent large segments constituting the circling coil U31, thick chain lines represent small segments constituting the circling coil U31, thin solid lines denote large segments organizing the circling coil U32 and thin chain lines denote small segments constituting the circling coil U32. Since the description thereon has been given above with reference to FIG. 6B, a further description will be omitted for brevity.

As described above, the inside-slot conductor portions of the partial coil U3, together with the circling coil U31 and the circling coil U32, are accommodated in the same fourth in-phase slots (slot numbers 4, 16, 28, ... 12$n$+4).

Moreover, the protruding end portions of the circling coil U31 and the protruding end portions of the circling coil U32 alternately extend between the inside-slot conductor portions.

Second Embodiment

The difference of a second embodiment of the present invention from the above-described first embodiment is the relationship among lap winding and wave winding segments and large and small segments, and the accommodation configurations of segments in slots.

A large segment is a lap winding segment, and its pair of protruding end portions are bent in circumferential directions to approach each other and are connected to protruding end portions of another small segment by means of, for example, welding.

Moreover, a small segment is a wave winding segment, and its pair of protruding end portions are bent in circumferential directions to separate from each other and are connected to the protruding end portions of another large segment by means of, for example, welding.

Figure 10:
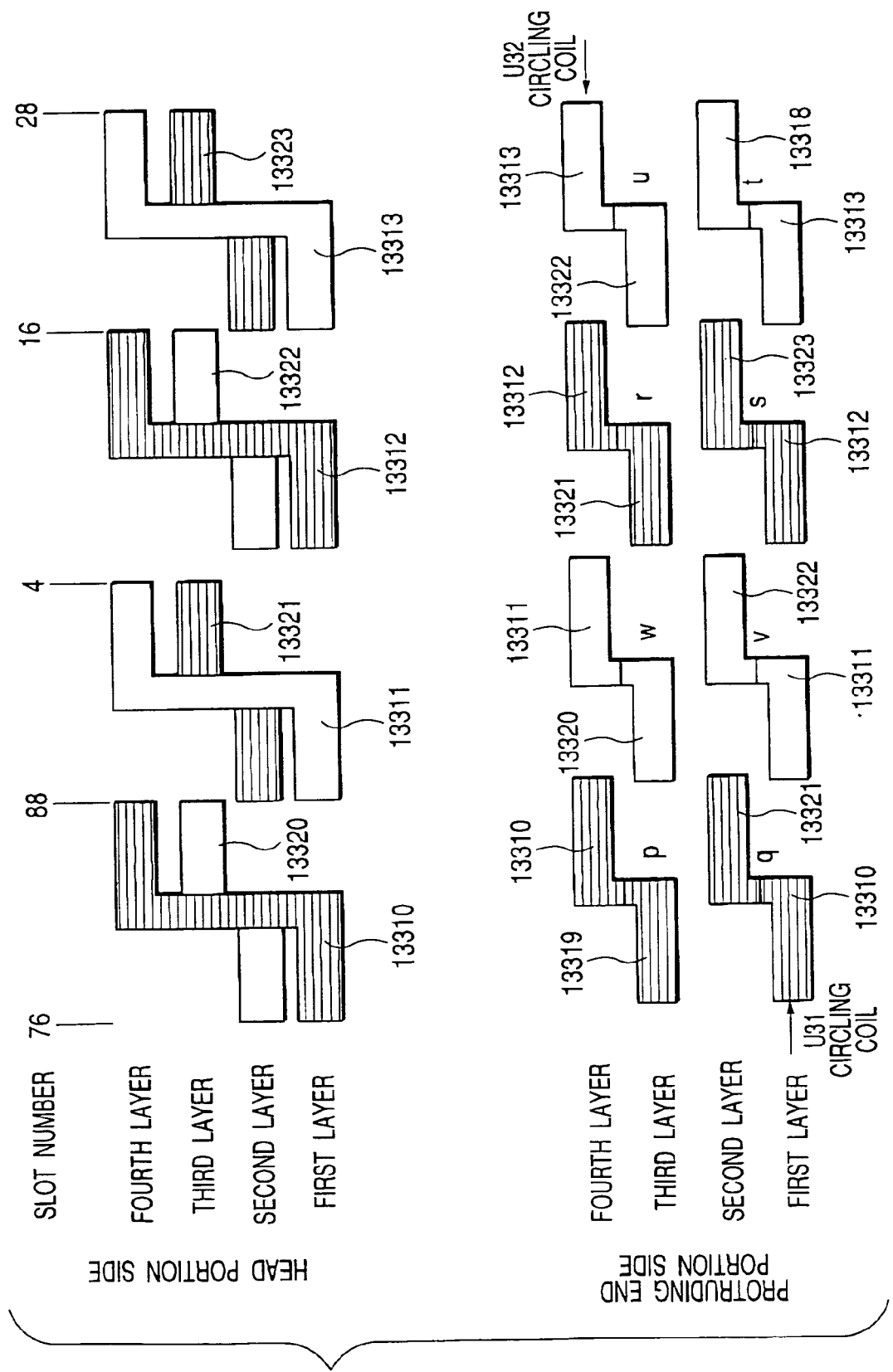
FIG. 10 is an illustration of wire connections of segments of U31 circling coils and U32 circling coils in a second embodiment of the present invention.

In regard to this matter, only the difference from the first embodiment will be described with reference to FIG. 10, and the other is the same as the first embodiment and the description thereof will be omitted for simplicity. FIG. 10 shows only a portion of circling coils constituting the partial coil U3.

The circling coils U31 and U32 are made up of a large number of large segments 13310, 13311, . . . , and a large number of small segments 13320, 13321, 13322, . . . .

The inside-slot conductor portions of the large segment 13310 are accommodated in the first layer of the slot of number 76 and the fourth layer of the slot of number 88. Moreover, the inside-slot conductor portions of the large segment 13311 are accommodated in the first layer of the slot of number 88 and the fourth layer of the slot of number 4, the inside-slot conductor portions of the large segment 13312 in the first layer of the slot of number 4 and the fourth layer of the slot of number 16, and inside-slot conductor portions of the large segment 13313 in the first layer of the slot of number 16 and the fourth layer of the slot of number 28.

On the other hand, the inside-slot conductor portions of the small segment 13320 are accommodated in the second layer of the slot of number 76 and the third layer of the slot of number 88. Moreover, the inside-slot conductor portions of the small segment 13321 are accommodated in the second layer of the slot of number 88 and the third layer of the slot of number 4, the inside-slot conductor portions of the small segment 13322 in the second layer of the slot of number 4 and the third layer of the slot of number 16, and inside-slot conductor portions of the small segment 13323 in the second layer of the slot of number 16 and the third layer of the slot of number 28.

In each of the large segment and the small segment, the head portion having a U-like line configuration and protruding toward one end side of the stator core makes a connection between the one end sides of its pair of inside-slot conductor portions. Moreover, its pair of protruding end portions continuing into the other end sides of the pair of inside-slot conductor portions protrude toward the other end side of the stator core to extend in generally circumferential directions. The head portion and the protruding end portions constitute an outside-slot conductor portion.

The large segment is a lap winding segment in which the pair of protruding end portions are bent in circumferential directions to approach each other, with the protruding end portions thereof being connected to the protruding end portions of the other small segments by means of, for example, welding.

The small segment is a wave winding segment in which the pair of protruding end portions are bent in circumferential directions to separating from each other, with the protruding end portions thereof being connected to the protruding end portions of the other large segments by means of, for example, welding.

A more detailed description will be given hereinbelow with reference to FIG. 10. In the illustration, the circling coil U31 is indicated by horizontal line patterns, and in the large segment 13310 constituting the circling coil U31, one (right side) of its inside-slot conductor portions is accommodated in the slot 88 and the protruding end portion continuing thereinto is bent toward the slot 76 and is connected to the protruding end portion of the small segment 13319 at the point P. Moreover, the other inside-slot conductor portion (left side) thereof is accommodated in the slot 76 and the protruding end portion continuing thereinto is bent toward the slot 88 and is connected to the protruding end portion of the small segment 13321 at the point q.

One (left side) of the inside-slot conductor portions of the small segment 13321 is accommodated in the slot 88, and the other inside-slot conductor portion (right side) is accommodated in the slot 4, with they being connected through the head portion. The protruding end portion continuing into the other inside-slot conductor portion (right side) is bent toward the slot 16 to be connected to the protruding end portion of the large segment 13312 at the point r.

That is, in a range from the connection point p to the connection point r, one large segment 1310 and one small segment 13321 are connected to each other at the connection point q. The large segment 13310 is a lap winding segment shaped into a generally ring-like configuration around the slot 76 and the slot 88, while the small segment 13321 is a wave winding segment from the middle point between the slot 76 and the slot 88 to the middle point between slot 4 and the slot 16. A plurality of segment sets each thus constructed are placed successively in a circumferential direction to make a generally one circle in the circumferential direction, thereby forming the circling coil U31. That is, in FIG. 10, the circling coil U31 is formed by connecting the small segment 13319, the large segment 13310, the small segment 13321, the large segment 13312 and the small segment 13323 in this order.

On the other hand, in FIG. 10, the circling coil U32 is indicated by solid line patterns, and is formed in a manner such that the protruding end portions of a small segment 13318, a large segment 13313, a small segment 13322, a large segment 13311 and a small segment 13320 are connected at connection points u, t, w and v.

The large segment 13313 is a lap winding segment shaped into a generally ring-like configuration around the slot 28 and the slot 16, and the small segment 13322 is a wave winding segment from the middle point between the slot 16 and the slot 28 to the middle point between the slot 88 and the slot 4. A plurality of segment sets each thus constructed are placed successively in a circumferential direction to make a generally one circle in the circumferential direction, thereby forming the circling coil U32.

An end portion of the circling coil U31, which substantially circles the stator core clockwise as mentioned above, is connected through a shape-different segment (not shown) to an end portion of the circling coil U32 which substantially circles the stator core counterclockwise.

The key point of the present invention is the locations of the partial coils and the in-phase group slots, and the inside-slot conductor portions of the partial coil U1 which is an input/output terminal connection partial coil provide a large electric potential difference in relation to the other phase coil, as compared with the other partial coils. For this reason, of the U-phase slot group (slot 1 to slot 4), they are disposed in the slot 3 other than the slots 1 and 4 existing at end portions in circumferential directions. Therefore, the distance between the outside-slot conductor portions continuing into the inside-slot conductor portions of the partial coil U1 and the outside-slot conductor portions of the adjacent phase coils V3 and W4 is lengthened, thereby reducing the electric potential difference to improve the insulating performance.

In addition, the inside-slot conductor portions of the partial coil U4 to be connected to the neutral point shows a small electric potential difference in relation to the other phase coils, as compared with the other partial coils. For this reason, they are accommodated in, of the U-phase slot group (slot 1 to slot 4), the slot of number 1 existing at an end portion in a circumferential direction (In this embodiment, although they are accommodated in the slot of number 1, it is also possible that they are accommodated in the slot of number 4. Therefore, (referring again to FIGS. 5A and 5B), the outside-slot conductor portions continuing into the inside-slot conductor portions of the partial coil U4 can provide a smaller electric potential with respect to the outside-slot conductor portions continuing into the inside-slot conductor portions of the partial coil V3 of the V-phase coil adjacent to the U phase, thus enhancing the insulating performance. Still additionally, the inside-slot conductor portions of the partial coil U1 and the inside-slot conductor portions of the partial coil U4 are formed in a state where another slot, concretely, the U2 slot, is interposed therebetween. Thus, a different partial coil slot having an intermediate electric potential is interposed between the inside-slot conductor portions of the partial coil U1 which makes a high voltage and the inside-slot conductor portions of the partial coil U4 which makes a low voltage, thereby reducing the electric potential difference between the in-phase outside-slot conductor portions.

Still additionally, since the partial coil U2 is connected to the partial coil U1 which serves as an input/output terminal connection partial coil, it makes a larger electric potential difference, second to the partial coil U1, in relation to the other phase coils, as compared with the other partial coils. For this reason, it is disposed in the slot 2 existing between the slot 1 and the slot 3 in the U-phase slot group (slot 1 to slot 4). Therefore, the distance between the outside-slot conductor portions continuing into the inside-slot conductor portions of the partial coil U3 and the outside-slot conductor portions of the adjacent phase coil is lengthened, thereby reducing the electric potential difference to improve the insulating performance.

Moreover, since the partial coil U3 is connected to the partial coil U4 which serves as a neutral point connection partial coil, it makes a smaller electric potential difference, second to the partial coil U4, in relation to the other phase coils, as compared with the other partial coils. For this reason, it is disposed in the slot existing another end portion different from the end portion for the partial coil U4, i.e., the slot of number 4, in the U-phase slot group (slot 1 to slot 4). Therefore, the outside-slot conductor portions continuing into the inside-slot conductor portions of the partial coil U3 can reduce the electric potential difference with respect to the outside-slot conductor portions continuing into the inside-slot conductor portions of the partial coil W4 of the adjacent W-phase coil, thereby improving the insulating performance.

According to this embodiment, it is possible to reduce the electric potential difference between the outside-slot portions of the partial coil existing at an end of the slot group and the partial coil of the slot group adjacent thereto and to reduce the electric potential difference between the adjacent outside-slot conductor portions in the in-phase slot group, thus enhancing the insulating performance.

As described above, according to the embodiment, a head portion, a pair of inside-slot conductor portions and a pair of protruding end portions extending in a generally circumferentical direction constitute a U-shaped segment, which provides easy handling and easy accommodation in a slot made in the stator core in its axial direction. Moreover, even in the case of using a large number of segments, the joining portions 331*d*, 331*e*, 332*d* and 332*e* of the protruding end portions 331*f*, 331*g*, 332*f* and 332*g* are positioned in a state shifted from each other, which provides satisfactory joining workability in an axial direction of the stator core. Still moreover, even if the stator core is constructed through the use of a large number of U-shaped segments, since the inside-slot conductor portions are accommodated in, of the in-phase slot group, the slots existing at the same positions in a circumferential direction, the joining portions can be disposed with regularity in a circumferentical direction, and the winding space factor is easily improvable.

Third Embodiment

The difference of a third embodiment of the present invention from the first embodiment is the employment of a different winding specification for each phase and, accordingly, a different angle of the coil with respect to the stator core. The other is the same as the first embodiment, and the description thereof will be omitted for brevity.

Figure 9:
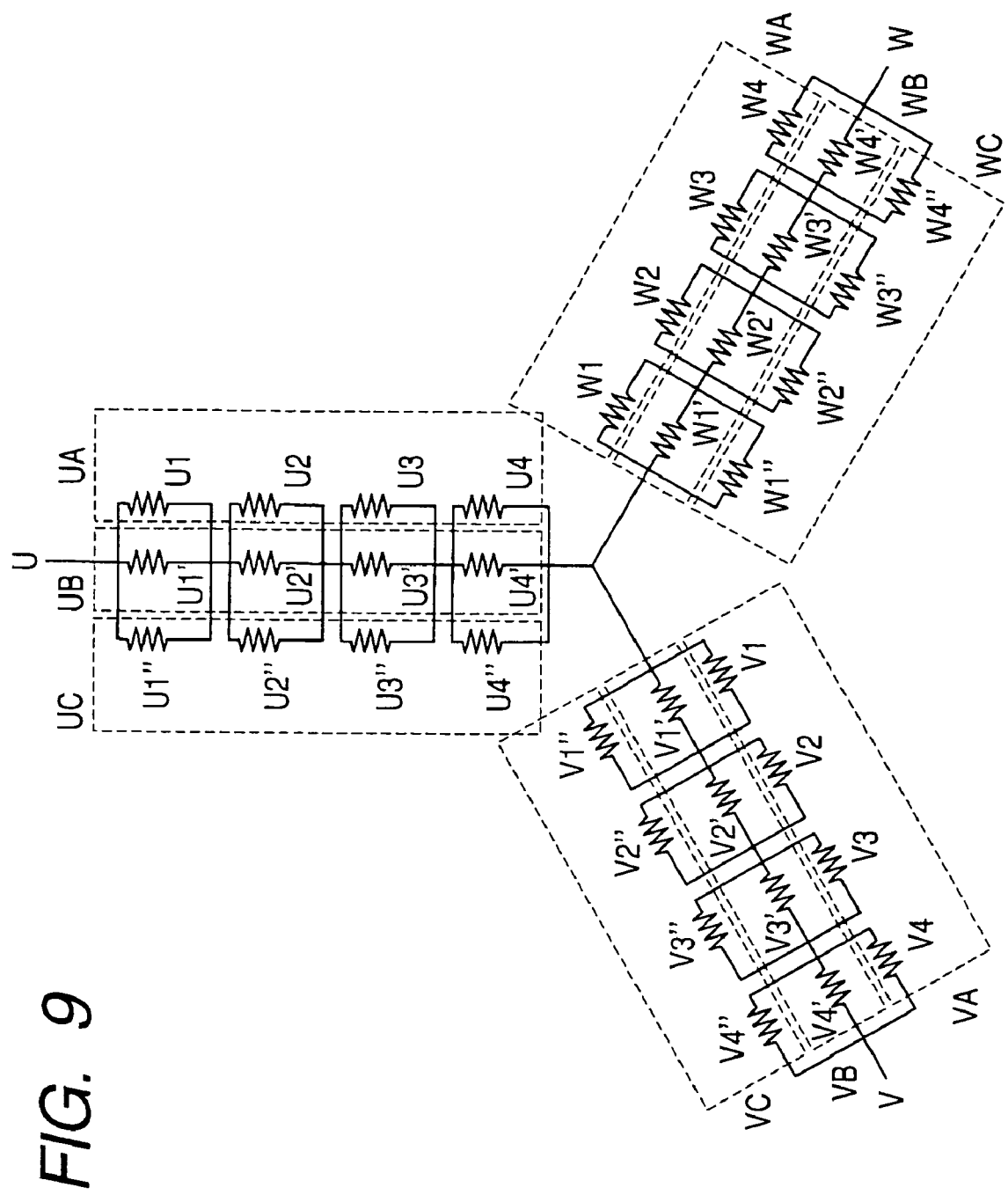
FIG. 9 is a development elevation of three-phase windings in the third embodiment.

In the third embodiment, three phase windings of U, V and W are star-connected as shown in FIG. 9.

For the U phase, the partial coils U1, U2, U3 and U4 are connected in series to each other to form a UA partial coil group 101, and partial coils U1', U2', U3' and U4' are similarly connected in series to each other to form a UB partial coil group 102, and further, partial coils U1", U2", U3" and U4" are connected in series to each other to form a UC partial coil group 103.

In addition, the partial coils U1, U1' and U1" are connected in parallel to each other. Likewise, the partial coils U2, U2' and U" are connected in parallel with each other, the partial coils U3, U3' and U3" are connected in parallel with each other, and the partial coils U4, U4' and U4" are connected in parallel with each other.

The partial coils for the V phase and W phase are arranged in like manner, and the description thereof will be omitted for brevity.

Figure 11:
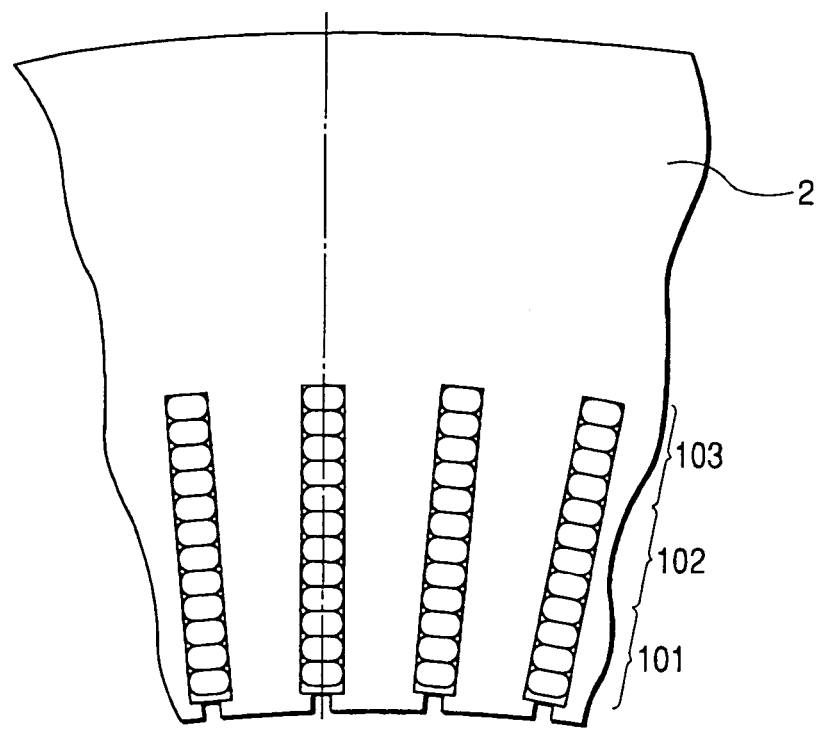
FIG. 11 is a cross-sectional view partially showing a coil configuration in the third embodiment.

In the third embodiment, as shown in FIG. 11, the slots of the stator core are made to accommodate 12 inside-slot conductor portions in a radial direction.

The UA partial coil group 101 is accommodated in four slot layers of the innermost section. In the third embodiment, the relationship between the UA partial coil group 101 and the four slot layers is the same as that in the above-described first embodiment, and the description thereof will be omitted for simplicity. In the slot accommodating the UA partial coil group 101, the UB partial coil group 102 and the UC partial coil group 103 are accommodated in the conductor accommodation positions of the remaining 8 layers. That is, the UB partial coil group 102 is accommodated in the outer circumferential side position of the UA partial coil group 101, and the UC partial coil group 103 is accommodated in the outer circumferential side position of the UB partial coil group 102, i.e., the outermost circumferential position.

Figure 8:
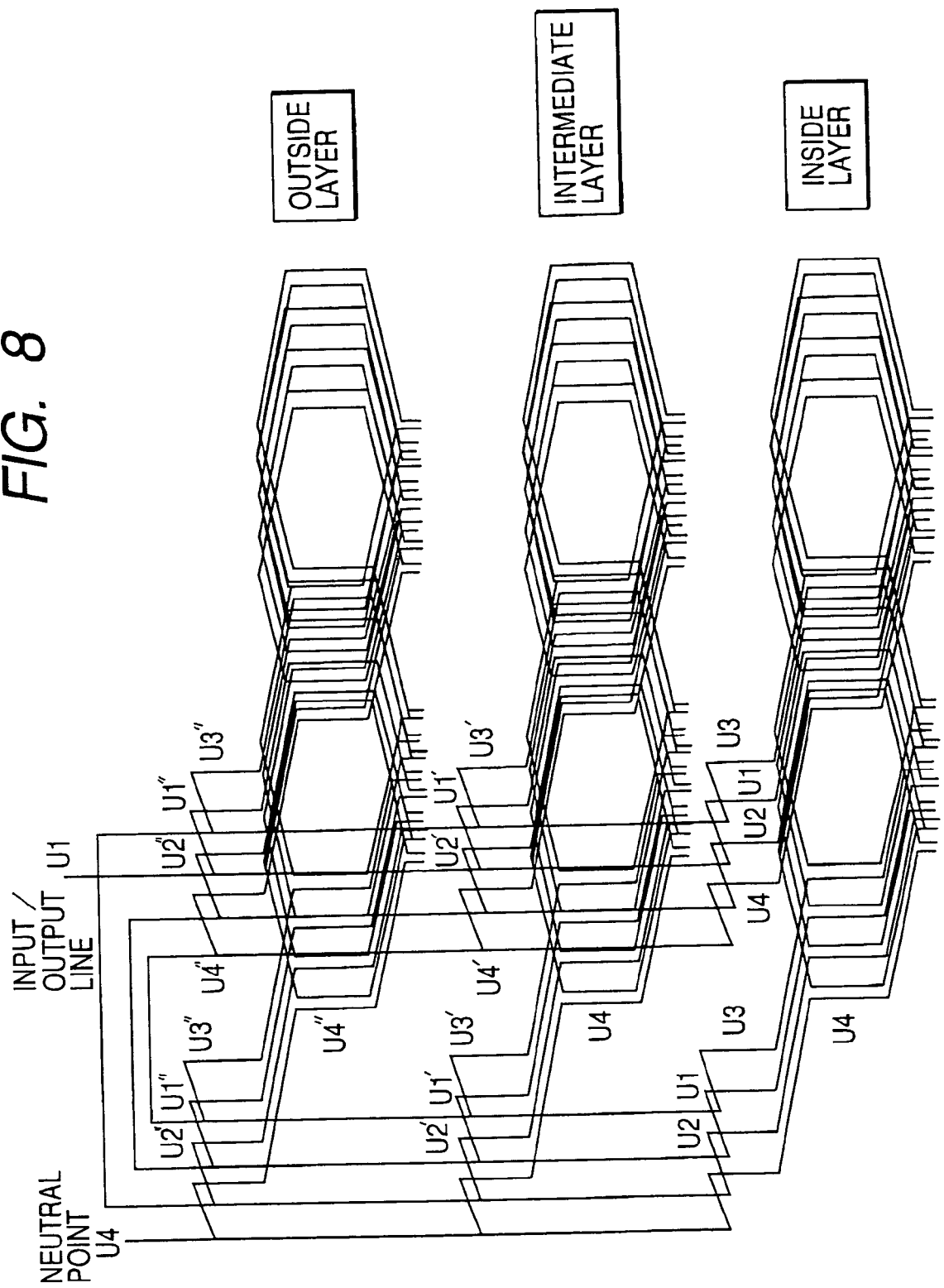
FIG. 8 is an illustration of connections of phase windings in a third embodiment according to the present invention.

FIG. 8 is a development elevation of the U-phase winding, where the radial positions of the slots for accommodating each slot group are shown simply. That is, FIG. 8 is a winding development elevation of, from the above, the UC partial coil group 103 forming an outer layer, the UB partial coil group 102 forming an intermediate layer and the UA partial coil group 101 forming an inner layer, and shows that the partial coils U1", U2", U3" and U4" of the UC partial coil group 103 are accommodated in the four layers of the outermost circumferential section of the slot, and the partial coils U1', U2', U3' and U4' of the intermediate-layer UB partial coil group 102 are accommodated in the four layers of the central section of the slot, and the partial coils U1, U2, U3 and U4 of the innermost-layer UA partial coil group are accommodated in the four layers of the innermost circumferential section of the slot.

In addition, the partial coils of the UA, UB and UC partial coil groups are accommodated in the slot in the order of U4, U2, U1, U3; U4', U2', U1', U3'; U4", U2", U1", U3". The concept is the same as that of the first embodiment, and the description thereof will be omitted for simplicity.

Thus, the partial coil U1 of the UA partial coil group 101, the partial coil U1' of the UB partial coil group 102 and the partial coil U1' of the UC partial coil group 103 are connected in parallel to each other. Moreover, the partial coil U2 of the UA partial coil group 101, the partial coil U2' of the UB partial coil group 102 and the partial coil U2" of the UC partial coil group 103 are connected in parallel to each other. Still moreover, the partial coil U3 of the UA partial coil group 101, the partial coil U3' of the UB partial coil group 102 and the partial coil U3" of the UC partial coil group 103 are connected in parallel to each other.

In this way, the connections can be made with regularity, and it is possible to avoid that the shape-different segment for the connection becomes unnecessarily complicated.

Figure 12:
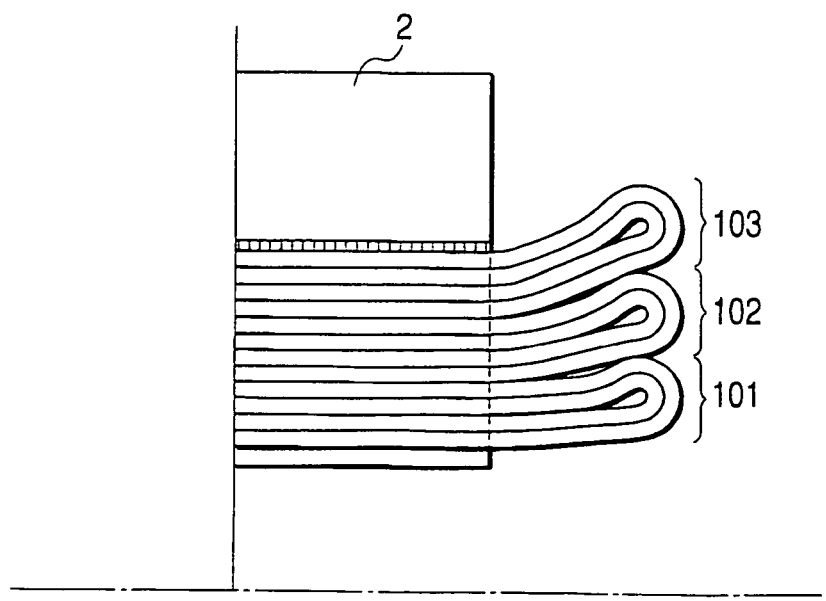
FIG. 12 is a cross-sectional view partially showing a coil configuration in the third embodiment.

Moreover, as shown in FIG. 12, the UC partial coil group 103 to be accommodated at the outermost circumferetial position, the UB partial coil group 102 inside it and the UA partial coil group 101 at the innermost circumferential position are greatly inclined in an outer diameter side with respect to an axial direction of the stator core. In more detail, the degree of the inclination becomes greater in the order of the UC partial coil group 103, the UB partial coil group 102 and the UA partial coil group 101. Therefore, the distance between the adjacent outside-slot conductor portions of the partial coil groups can be lengthened, thus enhancing the insulating performance. This is effective in providing an electric rotating machine capable of handling a larger output.

Fourth Embodiment

A description will be given hereinbelow of an electric rotating machine which is used as a motor generator (MG) for driving a vehicle.

Figure 13:
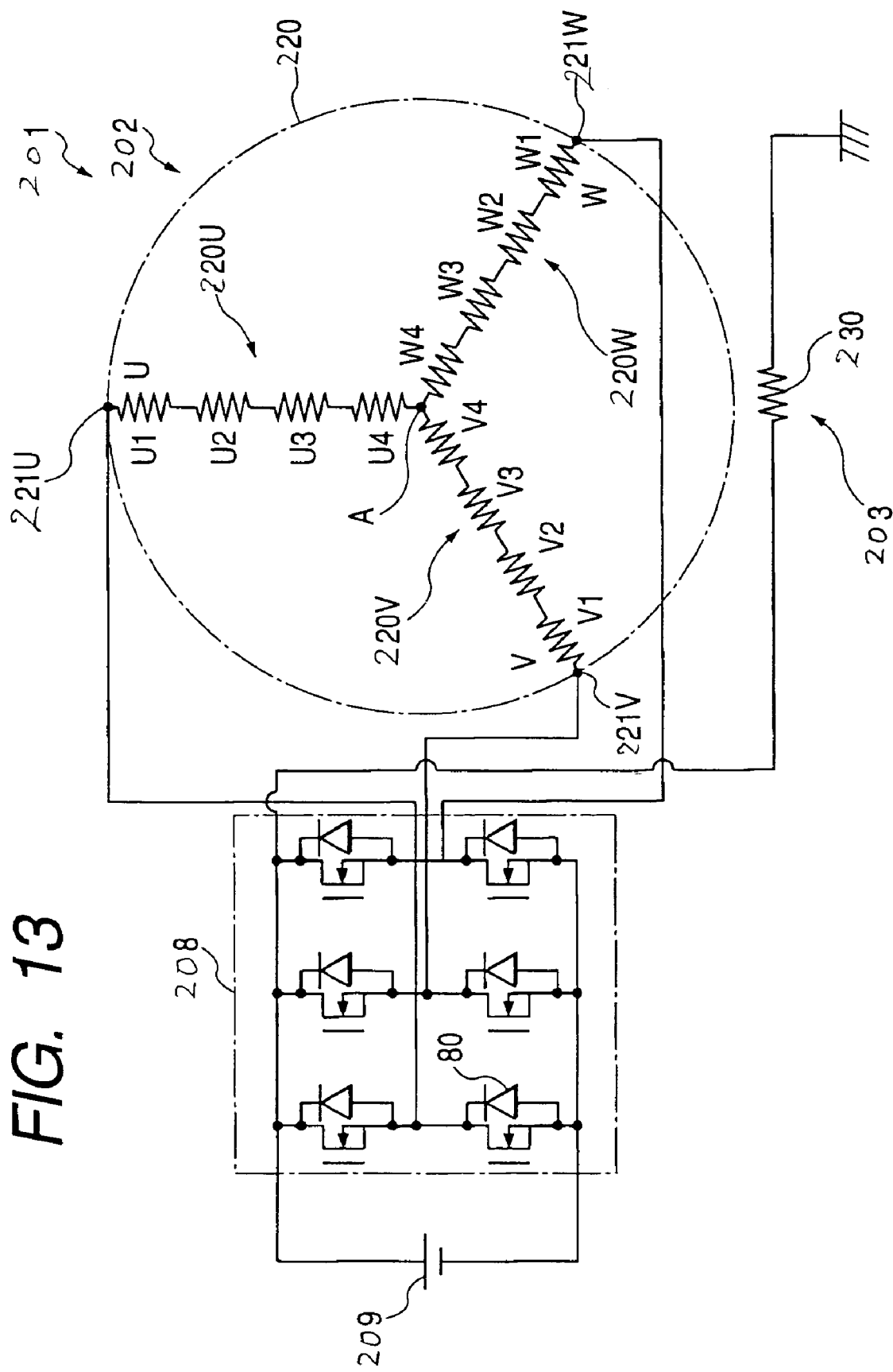
FIG. 13 is an illustration of a circuit arrangement of an electric rotating machine according to a fourth embodiment of the present invention.

First of all, a construction of the motor generator (which will be referred to hereinafter as an "MG") according to the fourth embodiment will be described hereinbelow with reference to FIG. 13. FIG. 13 shows a circuit arrangement of the MG according to this embodiment.

In FIG. 13, the MG, generally designated at reference numeral 201, comprises a stator 202 and a rotor 203. The stator 202 is composed of a stator coil 220 which is made in a manner such that a U-phase coil 220U, a V-phase coil 220V and a W-phase coil 220W are Y-connected as shown in the illustration. The U-phase coil 220U is formed by connecting circling coils U1, U2, U3 and U4 in series. Likewise, the V-phase coil 220V is formed by the series connections of circling coils V1, V2, V3 and V4 in series, and the W-phase coil 220W is formed by the series connections of circling coils W1, W2, W3 and W4. The rotor 203 is equipped with a field coil 230 or a field magnet (not shown). Moreover, an inverter 208 is interposed between a battery 209 and external leader terminals 221U, 221V and 221W of the respective phase coils 220U, 220V and 220W. The inverter 208 is composed of six power elements 280.

While a vehicle is driven, according to an instruction from a controller (not shown), a three-phase alternating-current voltage is applied from the battery 209 through the inverter 208 to the stator coil 220, thereby rotating the rotor 203. The rotary shaft (not shown) o the rotor 203 is connected directly or a clutch, a gear or the like to a crank shaft (not shown) of an engine. In the case of the direct connection thereto, the engine starts in response to the rotation of the rotary shaft of the rotor 203. On the other hand, during charging, due to the rotation of the crank shaft and the rotary shaft of the rotor 203, a current flows from the stator coil 220 to the battery 209. The battery 209 is charged by this current.

Figure 14:
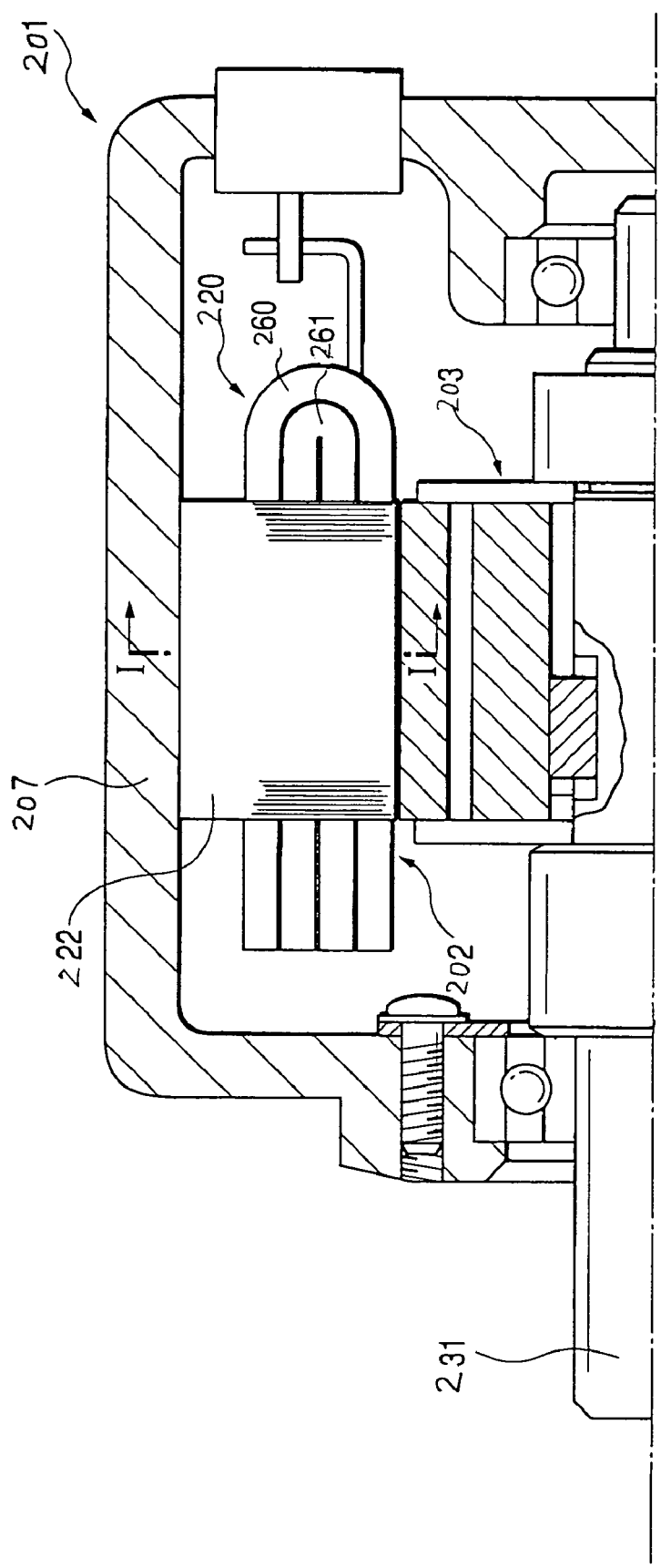
FIG. 14 is an axial cross-sectional view showing the electric rotating machine according to the fourth embodiment.

FIG. 14 is an axial cross-sectional view showing the MG 1 according to this embodiment, where an alternate long and short dash line represents an axis of the rotary shaft 231 of the rotor 203, and the opposite side with respect to this axis is omitted from the illustration. In FIG. 14, a housing 207 serves as an outer hull of the MG 201. A stator core 222 is fixedly secured to an inner circumferential surface of the housing 207, and groove-like slots (not shown) are formed in the inner circumferential surface of the stator core 222. The slots are made to extend in axial directions of the stator core 222, and they are arranged in circumferential directions of the stator core 222. Large segments 260 and small segments 261 are set in the slots. The large segment 260 and the small segments are equally referred to as "U-shaped segments" or "conductor segments". The large segments 260 and the small segments 261 are connected with regularity, thus establishing the stator coil 220.

Figure 15:
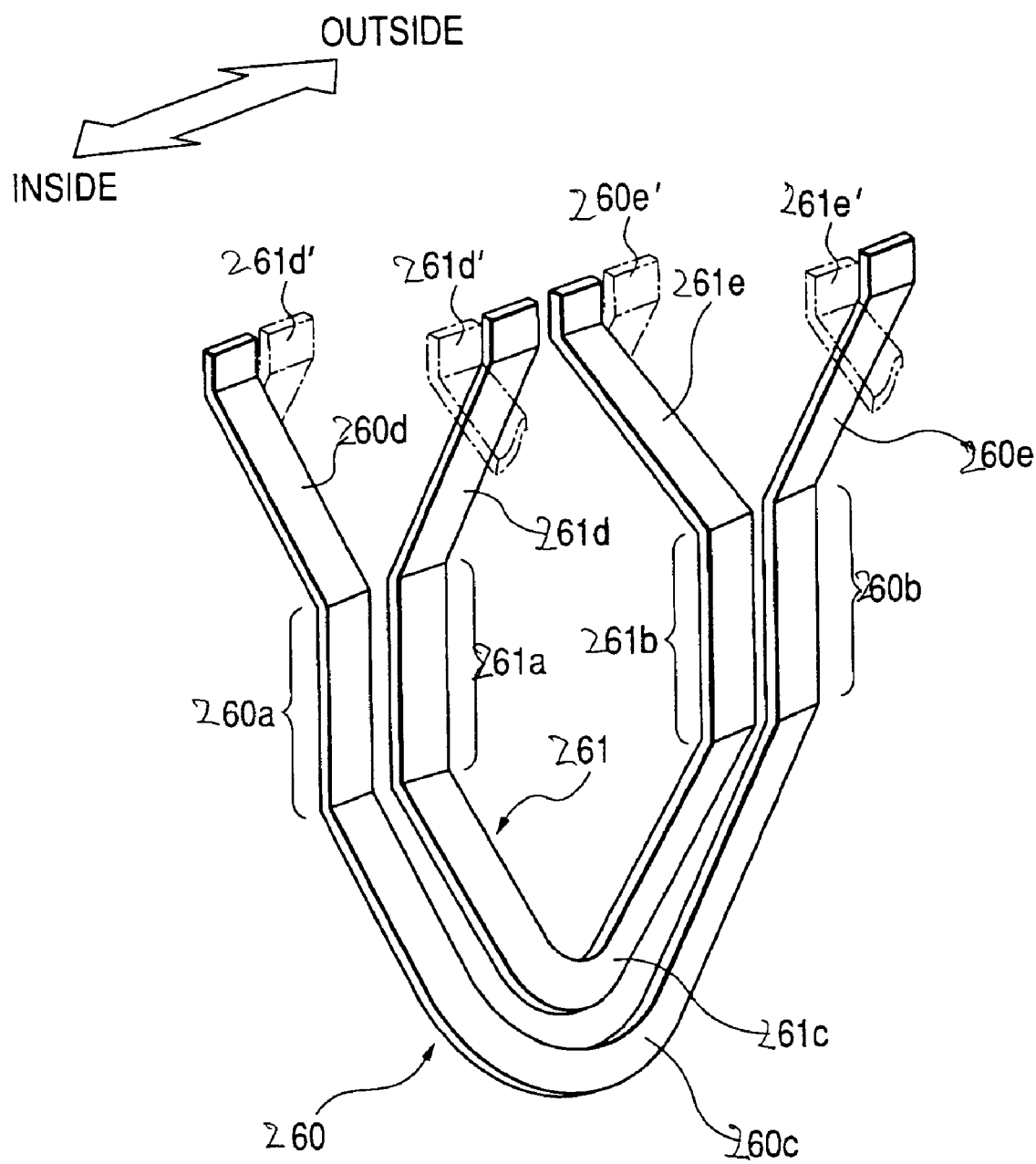
FIG. 15 is a perspective view showing a large segment and a small segment to be used for the electric rotating machine according to the fourth embodiment.

Secondly, the structures of the large segments 260 and the small segments 261 will again be described in more detail with reference to FIG. 15. FIG. 15 is a perspective view showing the large segments 260 and the small segments 261 to be used for the MG 201 according to this embodiment. As FIG. 15 shows, each of the large segment 260 and the small segment 261 has a U-like configuration.

The large segment 260 is composed of an inner circumferential side inside-slot conductor portion 260a, an outer circumferential side inside-slot conductor portion 260b, a head portion (curved portion) 260c, an inner circumferential side protruding end portion (open end portion) 260d and an outer circumferential side protruding end portion 260e. The outside-slot conductor portion in the present invention include the head portion 260c, the inner circumferential side protruding end portion 260d and the outer circumferential side protruding end portion 260e. The inner circumferential side inside-slot conductor portion 260a and the outer circumferential side inside-slot conductor portion 260b are accommodated in two slots separated from each other by a predetermined magnetic pole pitch. The inner circumferential side inside-slot conductor portion 260a is disposed on the inner circumferential side (inside) in a slot, while the outer circumferential side inside-slot conductor portion 260b is placed on the outer circumferential side (outside) in a slot. The head portion 260c is formed to make a connection between one end of the inner circumferential side inside-slot conductor portion 260a and one end of the outer circumferential side inside-slot conductor portion 260b in the exterior of the slot. The inner circumferential side protruding end portion 260d extends from the other end of the inner circumferential side inside-slot conductor portion 260a to the exterior of the slot. Likewise, the outer ccircumferential side protruding end portion 260e extends from the other end of the outer circumferential side inside-slot conductor portion 260b to the exterior of the slot.

As in the case of the large segment 260, the small segment 261 is composed of an inner circumferential side inside-slot conductor portion 261a, an outer circumferential side inside-slot conductor portion 261b, a head portion (curved portion) 261c, an inner circumferential side protruding end portion (open end portion) 261d and an outer circumferential side protruding end portion 261e. The outside-slot conductor portion in the present invention include the head portion 261c, the inner circumferential side protruding end portion 261d and the outer circumferential side protruding end portion 261e. The small segment 261 is disposed to be surrounded by the large segment 260. The inner circumferential side inside-slot conductor portion 261a and the outer circumferential side inside-slot conductor portion 261b are accommodated in two slots separated from each other by a predetermined magnetic pole pitch. The inner circumferential side inside-slot conductor portion 261a is disposed on the inner circumferential side (inside) in a slot, while the outer circumferential side inside-slot conductor portion 261b is placed on the outer circumferential side (outside) in a slot. The head portion 261c is formed to make a connection between one end of the inner circumferential side inside-slot conductor portion 261a and one end of the outer circumferential side inside-slot conductor portion 261b in the exterior of the slot. The inner circumferential side protruding end portion 261d extends from the other end of the inner circumferential side inside-slot conductor portion 261a to the exterior of the slot. Likewise, the outer circumferential side protruding end portion 261e extends from the other end of the outer circumferential side inside-slot conductor portion 261b to the exterior of the slot.

Secondly, a description will be given hereinbelow of a joining structure of the large segment 260 and the small segment 261.

The inner circumferential side protruding end portion 260d of the large segment 260 is welded to the inner circumferential side protruding end portion 261d' of a small segment 261 adjacent thereto. On the other hand, the outer circumferential side protruding end portion 260e of the large segment 260 is welded to the outer circumferential side protruding end portion 261e' of a small segment 261 adjacent thereto. The inner circumferential side protruding end portion 261d of the small segment 261 is welded to the inner circumferential side protruding end portion 260d' of a large segment 260 adjacent thereto. On the other hand, the outer circumferential side protruding end portion 261e of the small segment 261 is welded to the outer circumferential side protruding end portion 260e' of a large segment 260 adjacent thereto. The large segments 260 and the small segments 261 are connected over the entire circumference of the stator core 222 to make a circling coil.

Figure 16:
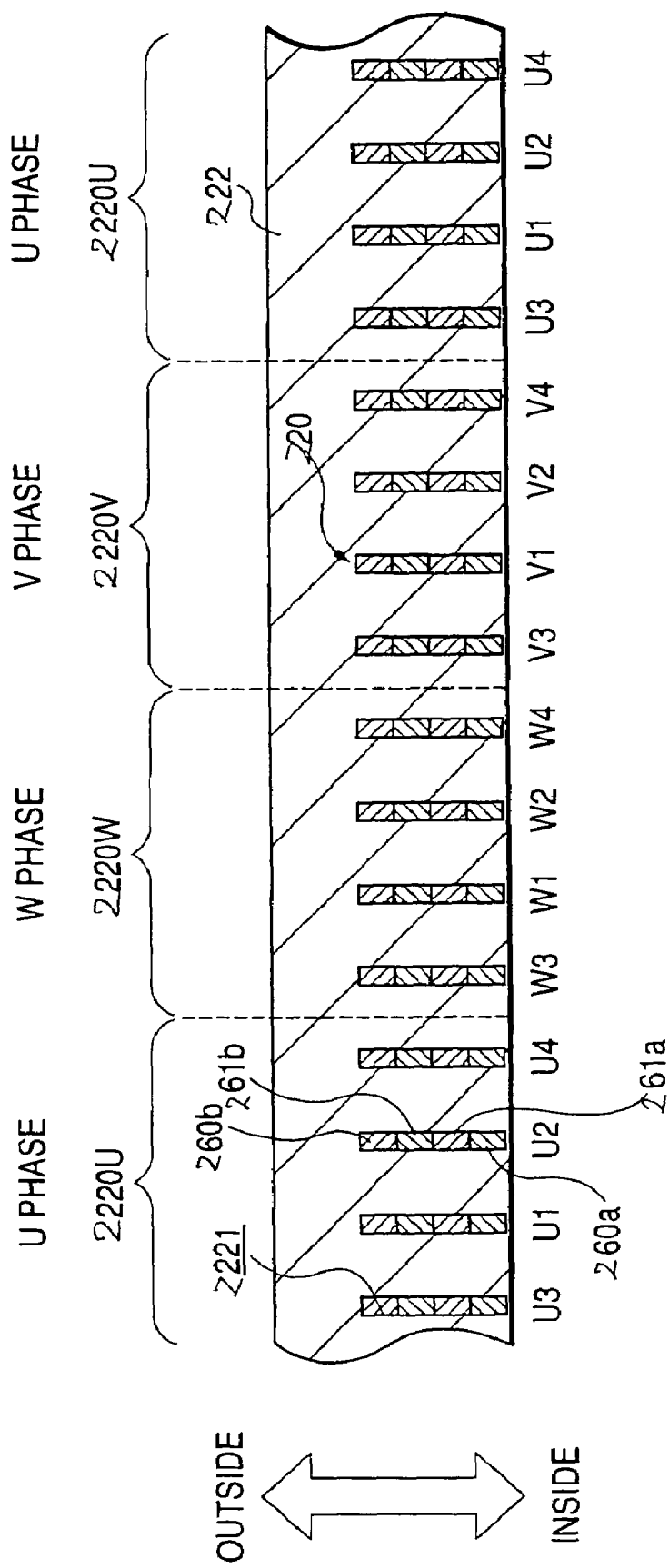
FIG. 16 is a cross-sectional view taken along a line I—I of FIG. 14.

FIG. 16 is a cross-sectional view taken along a line I—I of FIG. 14. As shown in FIG. 16, slots 2221 are made in the stator core 222, and in each of the slots 2221, the conductors, four layers in total, are disposed in the order of the inner circumferential side inside-slot conductor portion 260a of a large segment 260→the inner circumferential side inside-slot conductor portion 261a of a small segment 261→the outer circumferential side inside-slot conductor portion 261b of a small segment 261→the outer circumferential side inside-slot conductor portion 260b of a large segment 260 from the inner circumferential side to the outer circumferential side.

Each of a U-phase slot group 2220U, a V-phase slot group 2220V and a W-phase slot group 2220W is composed of four slots 2221. As mentioned above, four-turn conductors are accommodated in a single slot 2221. Therefore, the total number of turns becomes 16 turns. The U-phase slot group 2220U, the V-phase slot group 2220V and the W-phase slot group 2220W are repeatedly disposed along the inner circumferential surface of the stator core 222.

In the U-phase slot group 2220U, the circling coil U4 connected to a neutral point A and having a lowest electric potential (see FIG. 13) is disposed in the slot 2221 existing at the rightmost end portion in the illustration. Moreover, the low-potential circling coil U3, second in electric potential to the circling coil U4, is disposed in the slot 2221 existing at the leftmost end portion in the illustration. On the other hand, the circling coil U1 equipped with an external leader terminal 221U and having a highest electric potential is accommodated in the slot 2221 on the right side of the circling coil U3. The high-potential circling coil U2, second in electric potential to the circling coil U1, is accommodated in the slot 2221 on the left side of the circling coil U4. With respect to the V-phase slot group 2220V and the W-phase slot group 2220W, the circling coils are disposed in like manner. Accordingly, at the boundary portion between the U-phase slot group 2220U and the V-phase slot group 2220V, the circling coil U3 and the circling coil V4 are positioned in a state adjacent to each other. Likewise, at the boundary portion between the V-phase slot group 2220V and the W-phase slot group 2220W, the circling coil V3 and the circling coil W4 are positioned in a state adjacent to each other. Moreover, at the boundary portion between the W-phase slot group 2220W and the U-phase slot group 2220U, the circling coil W3 and the circling coil U4 are positioned in a state adjacent to each other.

Figure 17:
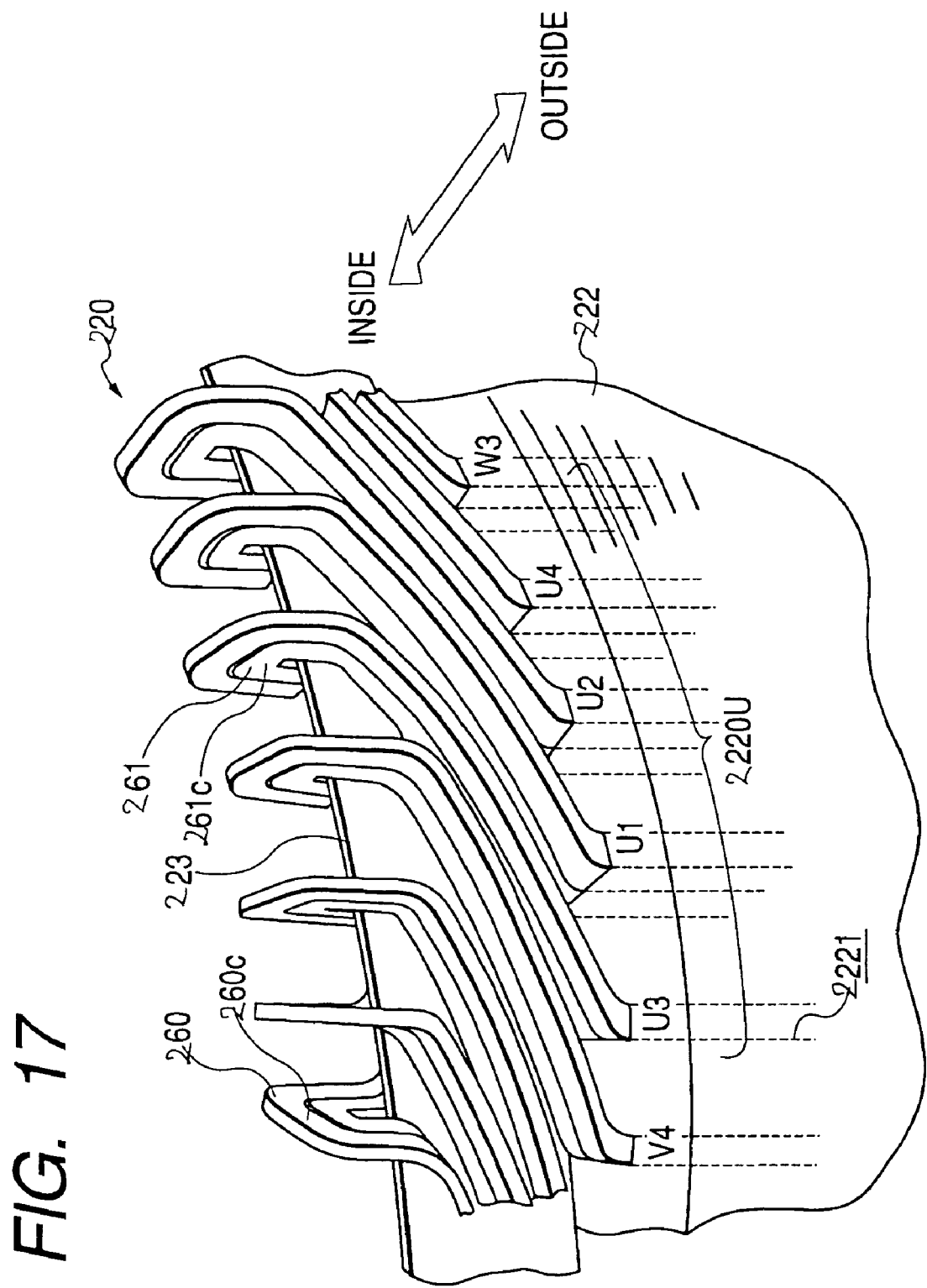
FIG. 17 is a perspective view showing a head portion side stator coil end portion of the electric rotating machine according to the fourth embodiment.

Furthermore, a description will be given hereinbelow of an insulating member interposed between adjacent head portions and between adjacent protruding end portions. FIG. 17 is a perspective view showing a head portion side stator coil end portion. As shown in FIG. 17, insulating paper 223 is placed in inner circumferential sides of head portions (curved portions) 261c of the small segments 261. This insulating paper 223 is included in the insulating member of the present invention. The head portions 260c of the large segments 260 and the head portions 261c of the small segments 261 are twisted in opposite directions of circumferential directions of the stator core 222 with respect to the insulating paper 223. The insulating paper 223 circles an end portion of the stator core 222.

FIG. 18 is a perspective view showing a protruding end portion side stator coil end portion. As shown in FIG. 18, insulating paper 224 is interposed between the inner circumferential side protruding end portions 260d of the large segments 260 and the inner circumferential side protruding end portions 261d of the small segments 261. The inner circumferential side protruding end portions 260d and the inner circumferential side protruding end portions 261d are twisted in opposite directions of circumferential directions of the stator core 222 with respect to the insulating paper 224. The insulating paper 224 circles an end portion of the stator core 222. Likewise, insulating paper 225 is interposed between the inner circumferential side protruding end portions 261d of the small segments 261 and the outer circumferential side protruding end portions 261e thereof. The inner circumferential side protruding end portions 261d and the outer circumferential side protruding end portions 261e are twisted in opposite directions of circumferential directions of the stator core 222 with respect to the insulating paper 225. The insulating paper 225 circles the end portion of the stator core 222. Moreover, insulating paper 226 is interposed between the outer circumferential side protruding end portions 261e of the small segments 261 and the outer circumferential side protruding end portions 260e of the large segment 260. The outer circumferential side protruding end portions 261e and the outer circumferential side protruding end portions 260e are twisted in opposite directions of circumferential directions of the stator core 222 with respect to the insulating paper 226. The insulating paper 226 circles the end portion of the stator core 222. These insulating paper 224, 225 and 226 are included in the insulating member of the present invention.

Secondly, a description will be given hereinbelow of the effects of the MG 201 according to this embodiment. In the MG 201 according to this embodiment, as shown in FIG. 16, the circling coil U3 and the circling coil V4 are disposed in a state adjacent to each other. Moreover, the circling coil V3 and the circling coil W4 are placed in a state adjacent to each other. Still moreover, the circling coil W3 and the circling coil U4 are located in a state adjacent to each other. The inter-coil electric potential difference of these three pairs of circling coils are relatively small. Therefore, in the case of the MG 201 according to this embodiment, the possibility of the occurrence of dielectric breakdown in circumferential directions is low.

In addition, in the MG 201 according to this embodiment, as shown in FIG. 17, the insulating paper 223 is disposed in the head portion side stator core end portion. Likewise, as shown in FIG. 18, the insulating paper 224, 225 and 226 are placed in the protruding end portion side stator coil end portion. Therefore, the possibility of the occurrence of dielectric breakdown in radial directions is low.

Fifth Embodiment

A description will be given hereinbelow of a fifth embodiment of the present invention. The difference of the fifth embodiment from the fourth embodiment is that 12 conductors are placed per slot.

Figure 19A:
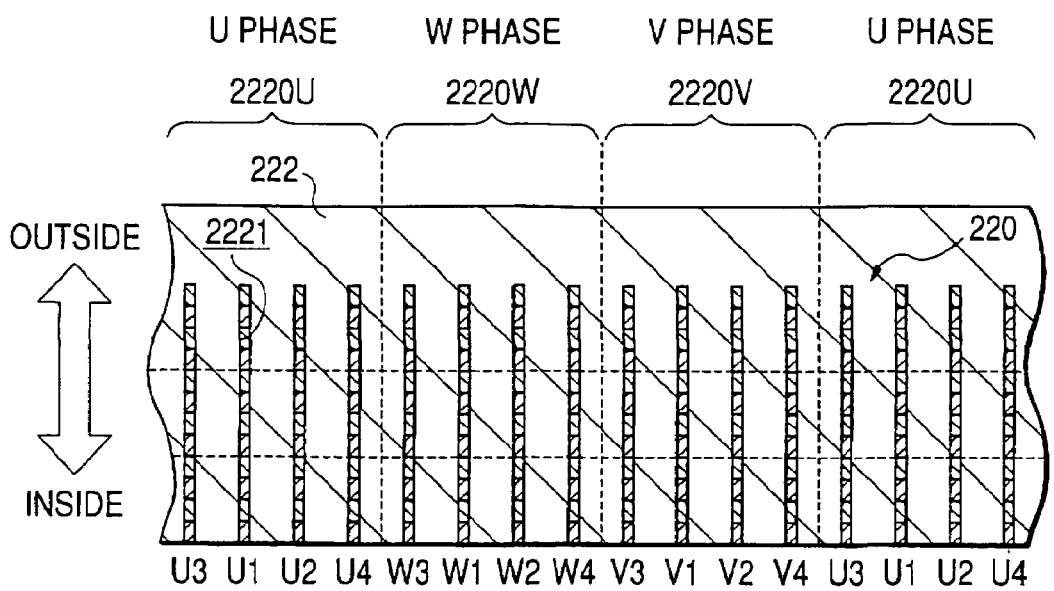
FIG. 19A is a radial cross-sectional view showing a stator core of an electric rotating machine according to a fifth embodiment of the present invention, viewed from its protruding end portion side.
Figure 19B:
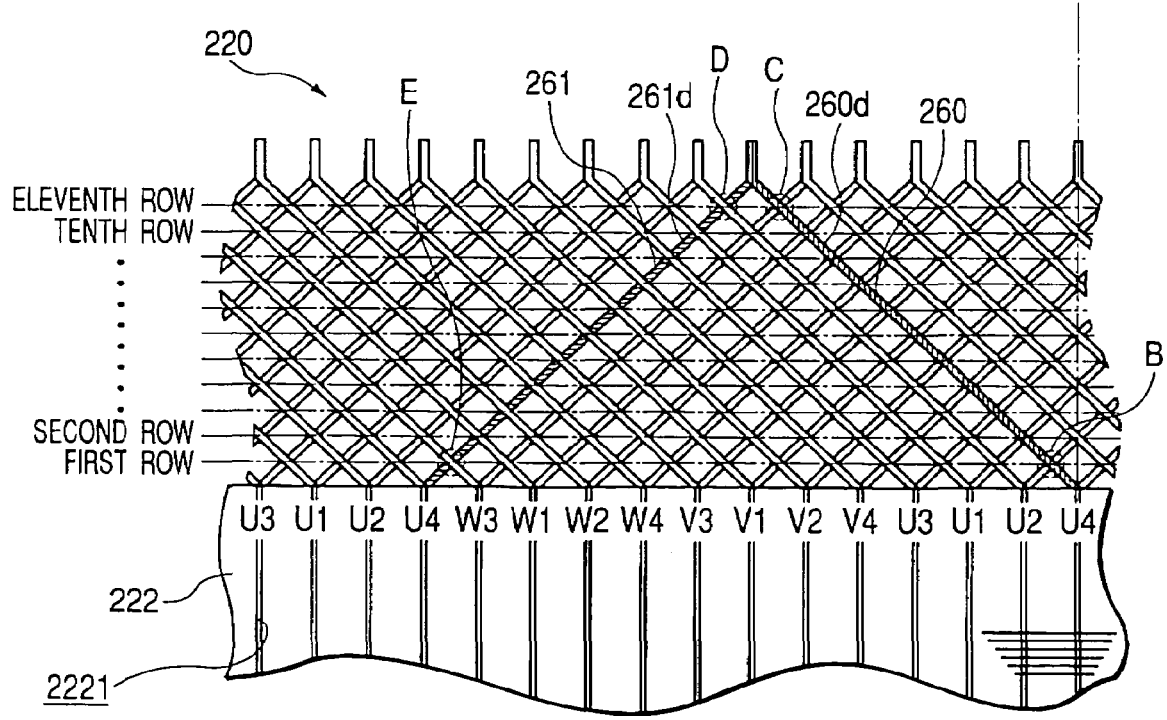
FIG. 19B is a front elevational view illustratively showing the stator core of the electric rotating machine according to the fifth embodiment, viewed from its inner circumferential side.

FIG. 19A is an illustrative radial cross-sectional view of a stator core of an MG according to this embodiment, viewed from the protruding end portion side, and FIG. 19B is an illustrative front elevational view of the stator core according to this embodiment, viewed from the inner circumferential surface side. The parts corresponding to those in FIG. 16 are marked with the same reference numerals.

As shown in FIG. 19A, 12 inside-slot conductor portions in total are accommodated in a single slot 2221. In the illustration, as partitioned by a dotted line, the stator coil 220 according to this embodiment is formed by radially stacking three stator coil layers each corresponding to that according to the fourth embodiment.

As shown in FIG. 19B, in an axial exterior of an axial end portion of the stator core 222, the inner circumferential side protruding end portions 260d of the large segments 260 and the inner circumferential side protruding end portions 261d of the small segments 261 intersect each other to form a lattice-like configuration, thus establishing many intersections. As shown in FIG. 19B, the intersections are axially arranged in 11 rows in total.

A description will be given hereinbelow of an intersecting state of the protruding end portions constituting the circling coil U4 and the protruding end portions of the other circling coils. The inner circumferential side protruding end portion 260d (indicated by vertical-line hatching in the illustration) of the large segment 260 constituting the circling coil U4 forms an intersection B together with the inner circumferential side protruding end portion 261d of the small segment 261. However, the electric potential difference between the circling coil U4 and the circling coil U2 is low. Therefore, the possibility of the occurrence of dielectric breakdown is low.

Moreover, the inner circumferential protruding end portion 260d of the large segment 260 constituting the circling coil U4 forms an intersection C in the eleventh row together with the inner circumferential side protruding end portion 261d of the small segment 261 constituting the circling coil W3. However, the electric potential difference between the circling coil U4 and the circling coil W2 is low. Therefore, the possibility of the occurrence of dielectric breakdown is low. The inner circumferential protruding end portion 260d of the large segment 260 constituting the circling coil U4 is welded to the inner circumferential side protruding end portion 261d (vertical-line hatching in the illustration) of the small segment 261 constituting the same circling coil U4 in an axial exterior of the eleventh row.

Still moreover, the inner circumferential protruding end portion 261d of the small segment 261 constituting the circling coil U4 forms an intersection D in the eleventh row together with the inner circumferential side protruding end portion 260d of the large segment 260 constituting the circling coil U2. However, the electric potential difference between the circling coil U4 and the circling coil U2 is low. Therefore, the possibility of the occurrence of dielectric breakdown is low.

Yet moreover, the inner circumferential protruding end portion 261d of the small segment 261 constituting the circling coil U4 forms an intersection E in the first row together with the inner circumferential side protruding end portion 260d of the large segment 260 constituting the circling coil W3. However, the electric potential difference between the circling coil U4 and the circling coil W3 is low. Therefore, the possibility of the occurrence of dielectric breakdown is low.

Although the above description relates to the intersection state of the protruding end portions making the circling coil U4 with respect to the protruding end portions of the other circling coils, the intersection states of the protruding end portions of the other circling coils are similar. That is, the electric potential difference between the protruding end portions forming an intersection in the first row and the electric potential difference between the protruding end portions forming an intersection in the eleventh row are low. For this reason, there is no need to place the insulating paper (not shown) in the first row and in the eleventh row. Therefore, in the MG according to this embodiment, the insulating paper are placed only in the range from the second row to the tenth row other than the first and eleventh rows. In this connection, the insulating paper are put on the head portion side (not shown) of the stator core 222 in like manner.

The MG according to this embodiment can provide the effects similar to those of the fourth embodiment, and in the case of the MG according to this embodiment, there is no need to place the insulating paper in the first row where the spacing between the protruding end portions is small. Therefore, the insulating paper interposition operation becomes easy. Moreover, in the case of the MG according to this embodiment, there is no need to place the insulating paper in the eleventh row susceptible to the welding heat. Therefore, it is possible to suppress the damages to the insulating paper due to the heat.

Sixth Embodiment

A description will be given hereinbelow of a sixth embodiment of the present invention. The difference of the sixth embodiment from the fourth embodiment is that 16 conductors are placed per slot. Therefore, the description of this embodiment will be given of only the difference therebetween.

Figure 20:
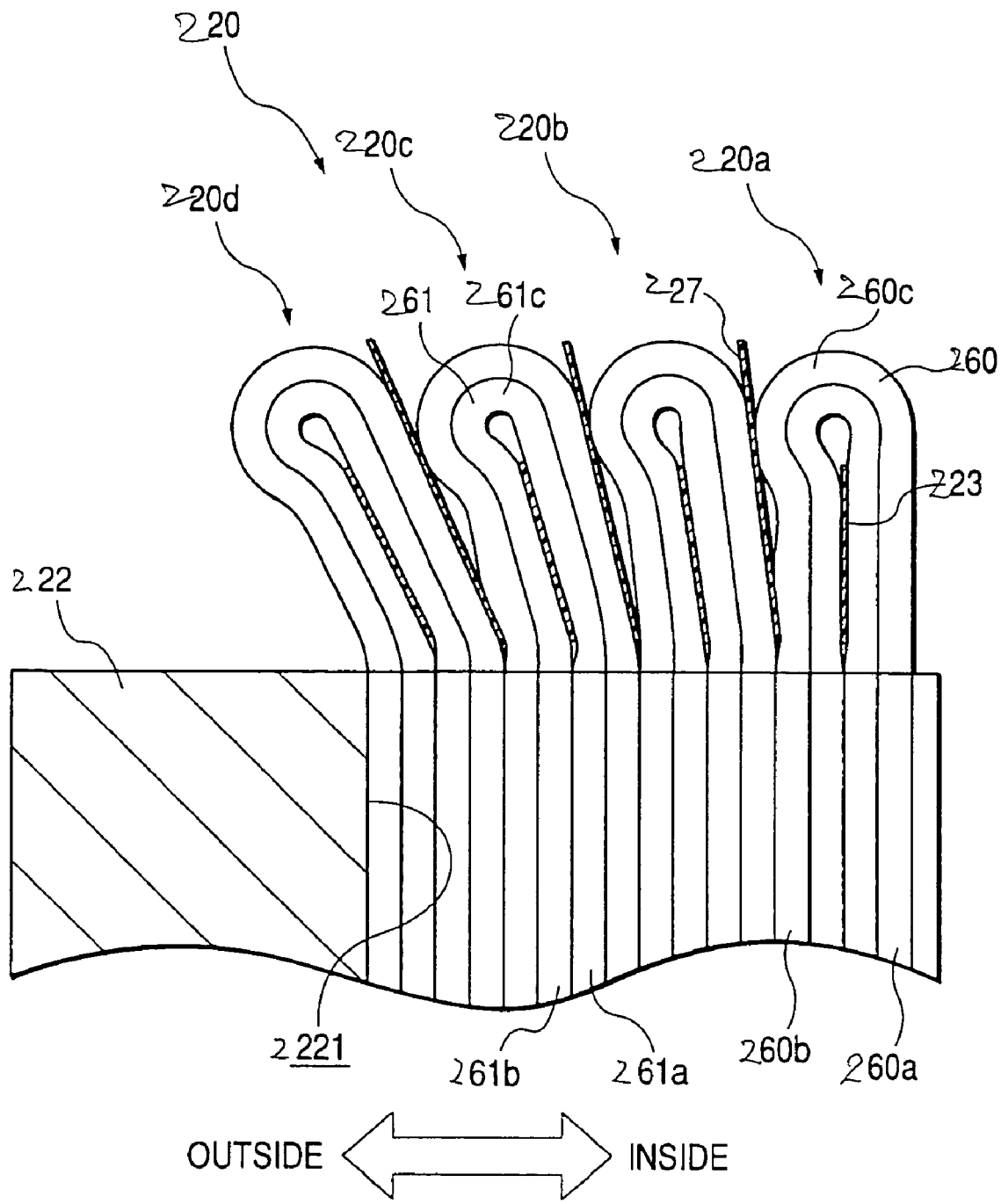
FIG. 20 is an axial partial cross-sectional view showing a stator core of an electric rotating machine according to a sixth embodiment of the present invention.

FIG. 20 is an axial partial cross-sectional view of a stator core of an MG according to this embodiment. The parts corresponding to those in FIG. 17 are marked with the same reference numerals. As shown in FIG. 20, a stator coil 220 according to this embodiment is formed by radially stacking four stator coil layers each corresponding to that (see FIG. 14) according to the fourth embodiment. That is, the stator coil 220 according to this embodiment is composed of four layers of unit coils 220a, 220b, 220c and 220d disposed concentrically from the inner circumferential side to the outer circumferential side. The unit coils 220a, 220b, 220c and 220d forming four layers are inclined more greatly in a radial and outward direction as they are positioned more externally. In addition, the head portions 260c and the head portions 261c are twisted in circumferential directions.

In the MG according to this embodiment, in addition to the inner circumferential sides of the head portions 261c of the small segments 261 adjacent radially to each other, insulating paper are interposed between the head portions 260c of the large segments 260 adjacent radially to each other (between the unit coils) as shown in FIG. 20. This insulating paper is included in the insulating member in the present invention. The insulating paper 227 are interposed between the unit coils before the head portions 260c and the head portions 261c are twisted in the circumferential directions and before the unit coils 220b, 220c and 220d are inclined in a radial and outward direction. Therefore, in the MG according to this embodiment, the possibility that sliding contact occurs between the adjacent unit coils (between the head portions 260c) becomes low in the segment assembling operation. Moreover, the insulating paper 223 decreases the possibility of the occurrence of sliding contact between the inner circumferential surface portions of the head portion 261c. Therefore, it is possible to decrease the possibility of the occurrence of damages to the insulating coat. Accordingly, the possibility of the occurrence of dielectric breakdown becomes low. Still moreover, the insulating paper 223 and 227 improve the slippage in the segment assembling operation, which reduces the resistance in the formation of the head portions 260c and the head portions 261c. This improves the working efficiency.

It should be understood that the present invention is not limited to the above-described embodiments, and that it is intended to cover all changes and modifications of the embodiments of the invention herein which do not constitute departures from the spirit and scope of the invention.

For example, in the present invention, any limitation is not imposed on the number of slots, the number of turns, the number of phases and others. It is also acceptable that the insulating members are not always interposed between all the outside-slot conductor portions adjacent to each other. Moreover, although in the above-described fourth to sixth embodiments the electric rotating machine according to the present invention is used as an MG, for example, it is also appropriate that the electric rotating machine according to the present invention is employed as a generator itself or a motor itself.

What is claimed is:

1. An electric rotating machine comprising:
   a U-phase coil constructed in a manner such that Un partial coils (U1, U2, U3, . . . ) which are n (n≧3) in number are connected in series to each other, with one end of said U-phase coil being connected to an input/output terminal;
   a V-phase coil constructed in a manner such that Vn partial coils (V1, V2, V3, . . . ) which are n (n≧3) in number are connected in series to each other, with one end of said V-phase coil being connected to an input/output terminal;
   a W-phase coil constructed in a manner such that Wn partial coils (W1, W2, W3, . . . ) which are n (n≧3) in number are connected in series to each other, with one end of said W-phase coil being connected to an input/output terminal;
   a ring-like stator core having a plurality of slot group sets formed in its circumferential directions, each including a U-phase slot group, a V-phase slot group and a W-phase slot group arranged continuously, said U-phase slot group for accommodating said n (n≧3) Un partial coils formed in a state adjacent to each other in said circumferential directions, said V-phase slot group for accommodating said n (n≧3) Vn partial coils formed in a state adjacent to each other in said circumferential directions, and said W-phase slot group for accommodating said n (n≧3) Wn partial coils formed in a state adjacent to each other in said circumferential directions;
   a stator winding to which the other ends of said U-phase coil, said V-phase coil and W-phase coil are connected; and
   a rotor having a plurality of magnetic poles formed along said circumferential directions,
   wherein each of said Un partial coils (U1, U2, U3, . . . ) includes a circling coil composed of Un inside-slot conductor portions accommodated in the corresponding U-phase slot group and outside-slot conductor portions for making connections between said Un inside-slot conductor portions in the exterior of the U-phase slot group, with said circling coil of said Un partial coil approximately circling said stator core in said circumferential directions, and each of said Vn partial coils (V1, V2, V3, . . . ) includes a circling coil composed of Vn inside-slot conductor portions accommodated in the corresponding V-phase slot group and outside-slot conductor portions for making connections between said Vn inside-slot conductor portions in the exterior of the V-phase slot group, with said circling coil of said Vn partial coil approximately circling said stator core in said circumferential directions, and each of said Wn partial coils (W1, W2, W3, . . . ) includes a circling coil composed of Wn inside-slot conductor portions accommodated in the corresponding W-phase slot group and outside-slot conductor portions for making connections between said Wn inside-slot conductor portions in the exterior of the W-phase slot group, with said circling coil of said Wn partial coil approximately circling said stator core in said circumferential directions, and said inside-slot conductor portions of each of said partial coils to be connected to said input/output terminals are accommodated in slots other than slots existing at end portions of each of said U-phase slot group, said V-phase slot group and said W-phase slot group in said circumferential directions.

2. The machine according to claim 1, wherein, of each of said Un partial coils, said Vn partial coils and said Wn partial coils, said inside-slot conductor portions of a partial coil connected to a neutral point are accommodated in slots existing at an end portion of each of said U-phase slot group, said V-phase slot group and said W-phase slot group in said circumferential directions.

3. The machine according to claim 1, wherein a slot of each of said slot groups is made to accommodate a plurality of inside-slot conductor portions of said inside-slot conductor portions in radial directions of said stator core, each of said circling coils is composed of a plurality of U-shaped segments, connected to each other, each having an outside-slot conductor portion of said outside-slot conductor portions and a pair of inside-slot conductor portions of said inside-slot conductor portions, said outside-slot conductor portion includes a U-shaped head portion protruding from one end side of said stator core to continue into one end portions of said pair of inside-slot conductor portions, and a pair of protruding end portions protruding from the other end side of said stator core to continue into the other end portions of said of inside-slot conductor portions and extending generally in said circumferential directions of said stator core, and said pair of inside-slot conductor portions are accommodated in a slot of an in-phase slot group of said slot groups at the same position in said circumferential directions and at different positions in said slot in said radial directions.

4. The machine according to claim 2, wherein, in each of said U-phase coil, said V-phase coil and said W-phase coil, said inside-slot conductor portions of a different partial coil are accommodated between said inside-slot conductor portions of said partial coil connected to said neutral point and said inside-slot conductor portions of said partial coil connected to said input/output terminal in each of the single U-phase slot group, the single V-phase slot group and the single W-phase slot group.

5. The machine according to claim 1, wherein, in each of said U-phase coil, said V-phase coil and said W-phase coil, said inside-slot conductor portions of said partial coil connected to said input/output terminal are accommodated at a central position in each of the single U-phase slot group, the single V-phase slot group and the single W-phase slot group, and said partial coil connected to a neutral point are accommodated at an end position therein, and said inside-slot conductor portions closer to said partial coil connected to said neutral point are accommodated at positions closer to an end portion of each of the single U-phase slot group, the single V-phase slot group and the single W-phase slot group.

6. The machine according to claim 3, wherein said head portions of said U-shaped segments are arranged in said slots of the stator core in said radial directions and are inclined with respect to an axial direction of said stator core so that the degree of the inclination of each of said U-shaped segments increases as said U-shaped segments are positioned more outwardly in said radial directions.

7. The machine according to claim 1, wherein said Un partial coils, said Vn partial coils and said Wn partial coils, extending in said radial directions, are concentrically arranged in parallel with each other.

8. An electric rotating machine comprising:

a ring-like stator core having a plurality of slot group sets formed in its circumferential directions, each continuously including:

a first phase slot group composed of n (n≧3) first slots formed in a state adjacent to each other in said circumferential directions; and a second phase slot group composed of n (n≧3) second slots formed in a state adjacent to each other in said circumferential directions;

a stator winding including:

a first phase coil made by connecting n (n≧3) first partial coils in series to each other, with one end of said first phase coil being connected to an input/output terminal; and a second phase coil made by connecting n (n≧3) second partial coils in series to each other, with one end of said second phase coil being connected to an input/output terminal, the other ends of said first phase coil and said second phase coil being connected to each other; and a rotor having a plurality of magnetic poles in its circumferential directions, wherein each of said first partial coils includes a circling coil accommodated in the corresponding first slots and composed of first inside-slot conductor portions and outside-slot conductor portions for making connections between said first inside-slot conductor portions in the exterior of said slot group sets, with said circling coil of said first partial coil approximately circling said stator core in said circumferential directions, and each of said second partial coils includes a circling coil accommodated in the corresponding second slots and composed of second inside-slot conductor portions and outside-slot conductor portions for making connections between said second inside-slot conductor portions in the exterior of said slot group sets, with said circling coil of said second patrial coil approximately circling said stator core in said circumferential directions, and said inside-slot conductor portions of each of said partial coils to be connected to said input/output terminal are accommodated in slots other than slots existing at end portions of each of said first and second phase slot groups in said circumferential directions.

\* \* \* \* \*